(12) United States Patent
Higuchi et al.

(10) Patent No.: US 6,330,604 B1
(45) Date of Patent: Dec. 11, 2001

(54) EXCLUSIVE CONTROL METHOD WITH EACH NODE CONTROLLING ISSUE OF AN EXCLUSIVE USE REQUEST TO A SHARED RESOURCE, A COMPUTER SYSTEM THEREFOR AND A COMPUTER SYSTEM WITH A CIRCUIT FOR DETECTING WRITING OF AN EVENT FLAG INTO A SHARED MAIN STORAGE

(75) Inventors: Tatsuo Higuchi, Fuchu; Toshiaki Tarui, Sagamihara; Katsuyoshi Kitai, Kokubunji; Shigeo Takeuchi, Hanno; Tatsuru Toba, Fuchu; Machiko Asaie, Koshigaya; Yasuhiro Inagami, Kodaira, all of (JP)

(73) Assignees: Hitachi, Ltd.; Hitachi ULSI Engineering Corp., both of Tokyo (JP)

( * ) Notice: Subject to any disclaimer, the term of this patent is extended or adjusted under 35 U.S.C. 154(b) by 0 days.

(21) Appl. No.: 09/102,812

(22) Filed: Jun. 23, 1998

Related U.S. Application Data

(63) Continuation of application No. 08/676,053, filed on Jul. 5, 1996, now Pat. No. 5,774,731, which is a continuation-in-part of application No. 08/408,561, filed on Mar. 22, 1995, now Pat. No. 5,822,605.

(30) Foreign Application Priority Data

Mar. 24, 1994 (JP) .................................................. 6-53405
Jun. 29, 1994 (JP) ................................................ 6-169995

(51) Int. Cl.[7] .................................................. G06F 15/167
(52) U.S. Cl. ........................................ 709/226; 711/145
(58) Field of Search ............................ 709/226; 711/145

(56) References Cited

U.S. PATENT DOCUMENTS 5,063,503   11/1991   Jordan ................................... 395/726
5,063,504 * 11/1991   Jordan ................................... 710/200
5,226,159 *  7/1993   Henson .................................... 707/8
5,230,070    7/1993   Liu ........................................ 711/145
5,454,108 *  9/1995   Devara Konda ....................... 709/104
5,696,959   12/1997   Guttag ................................... 395/595
6,073,211 *  6/2000   Cheng ................................... 711/122

FOREIGN PATENT DOCUMENTS 7-262155   10/1995   (JP) .
8-77127     3/1996   (JP) .

OTHER PUBLICATIONS

Nikkei Electronics, No. 630, Feb. 27, 1995, pp. 101–114 by Masai, et al.
Study Report of the Information Processing Society of Japan, vol. 89, No. 60, Jul. 1989 pp. 17–24 by Nakagawa, et al.

* cited by examiner

Primary Examiner—Eric Coleman
(74) Attorney, Agent, or Firm—Antonelli, Terry, Stout & Kraus, LLP

(57) ABSTRACT

A computer system including a plurality of processing nodes, at least one resource provided for use by any of the processing nodes and a plurality of register sets. Each register set is provided in each of the processing nodes for storing in parallel use status information indicating whether the resource is in exclusive use status or not. The computer system can also include a plurality of request issue circuits, each being provided in each of the processing nodes, for issuing individually requests for exclusive use of the resource, a message exchanging circuit for serializing requests issued by the request issue circuits into a serialized order and broadcasting the request to all of the processing nodes in the serialized order and a plurality of status control circuits. Each status control circuit is provided in each of the processing nodes corresponding to each of the register sets to update individually a corresponding register set depending on use status information stored in the corresponding register set and each of the requests for exclusive use of the resource received at a corresponding node.

12 Claims, 17 Drawing Sheets

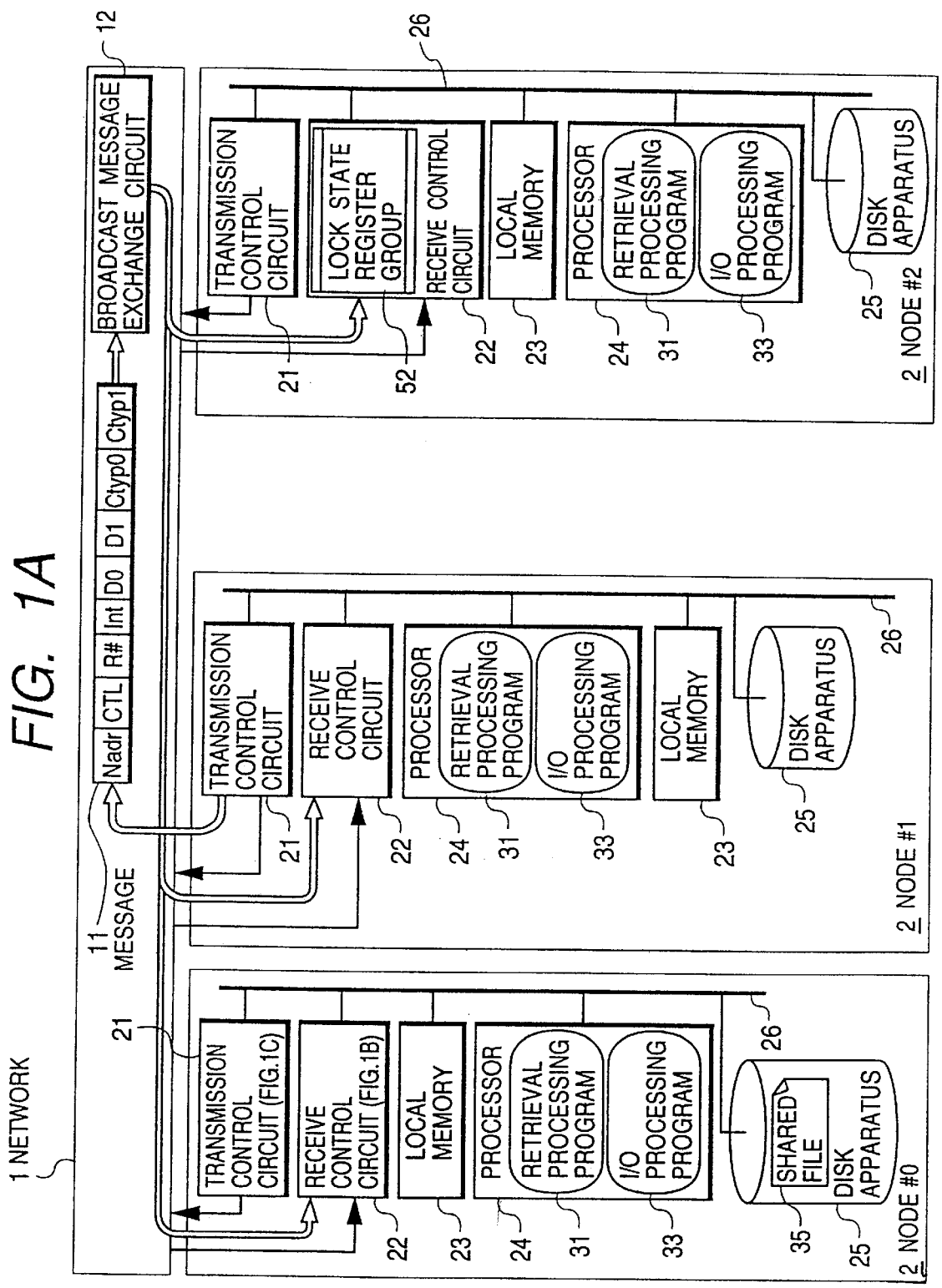

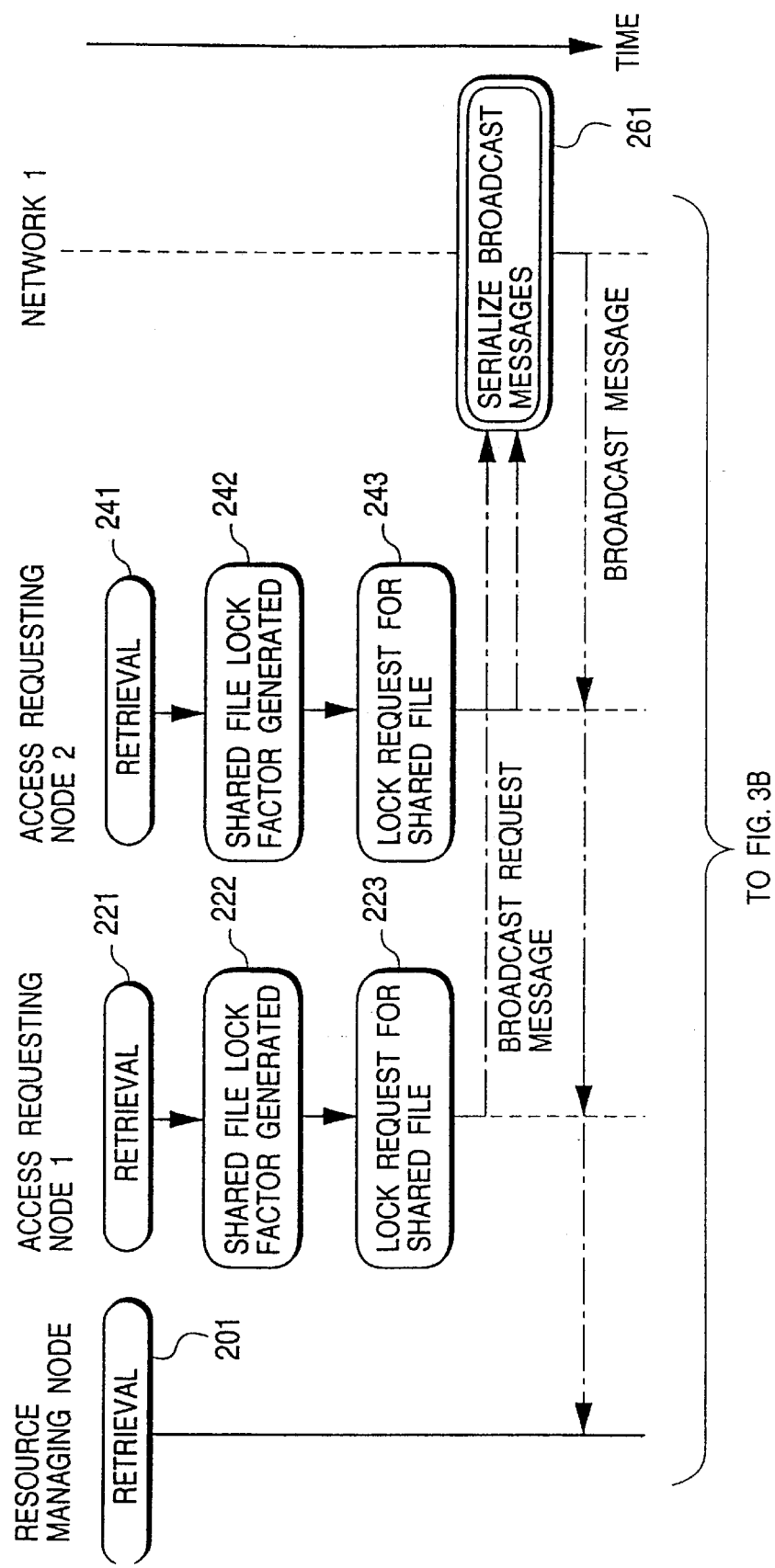

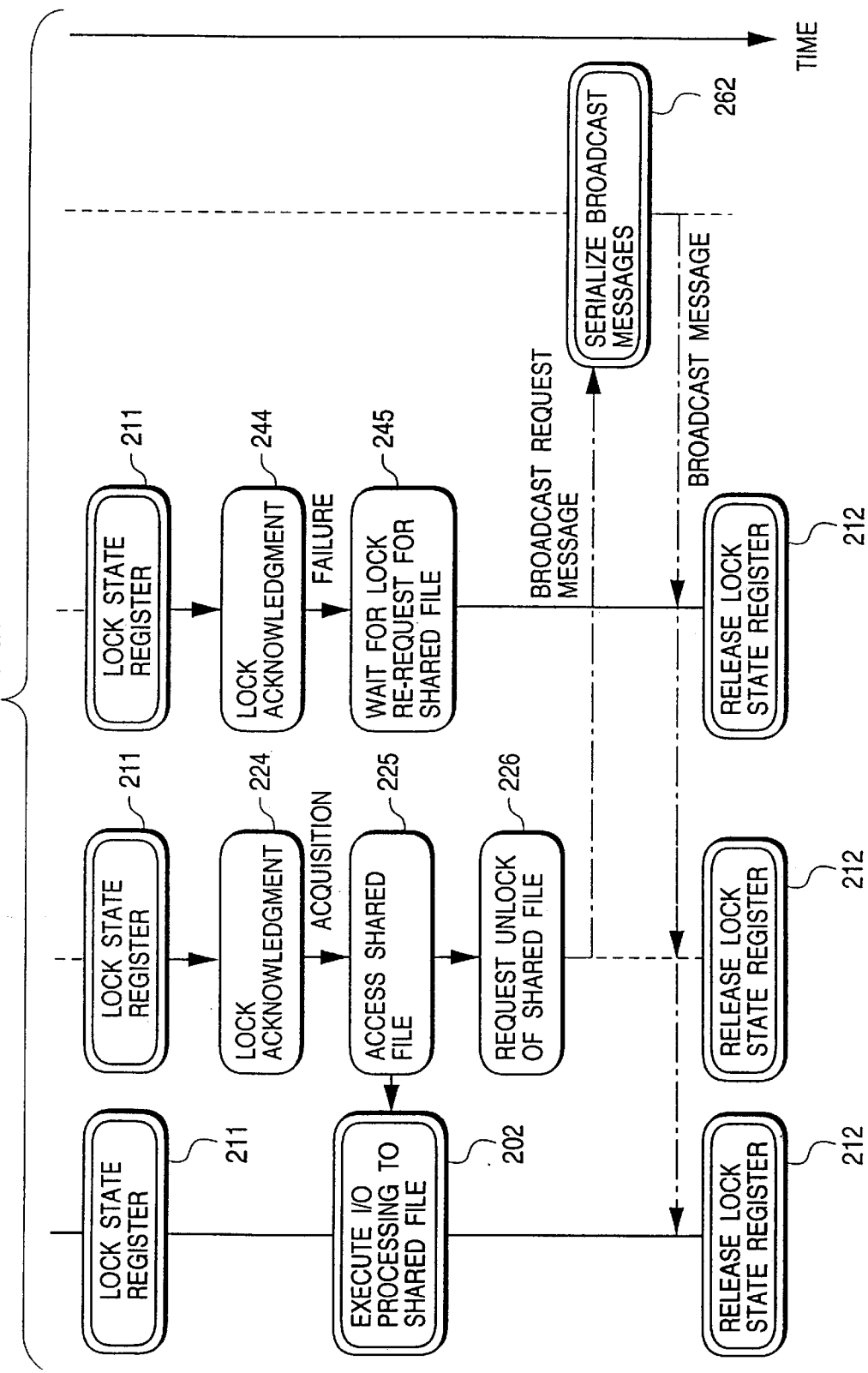

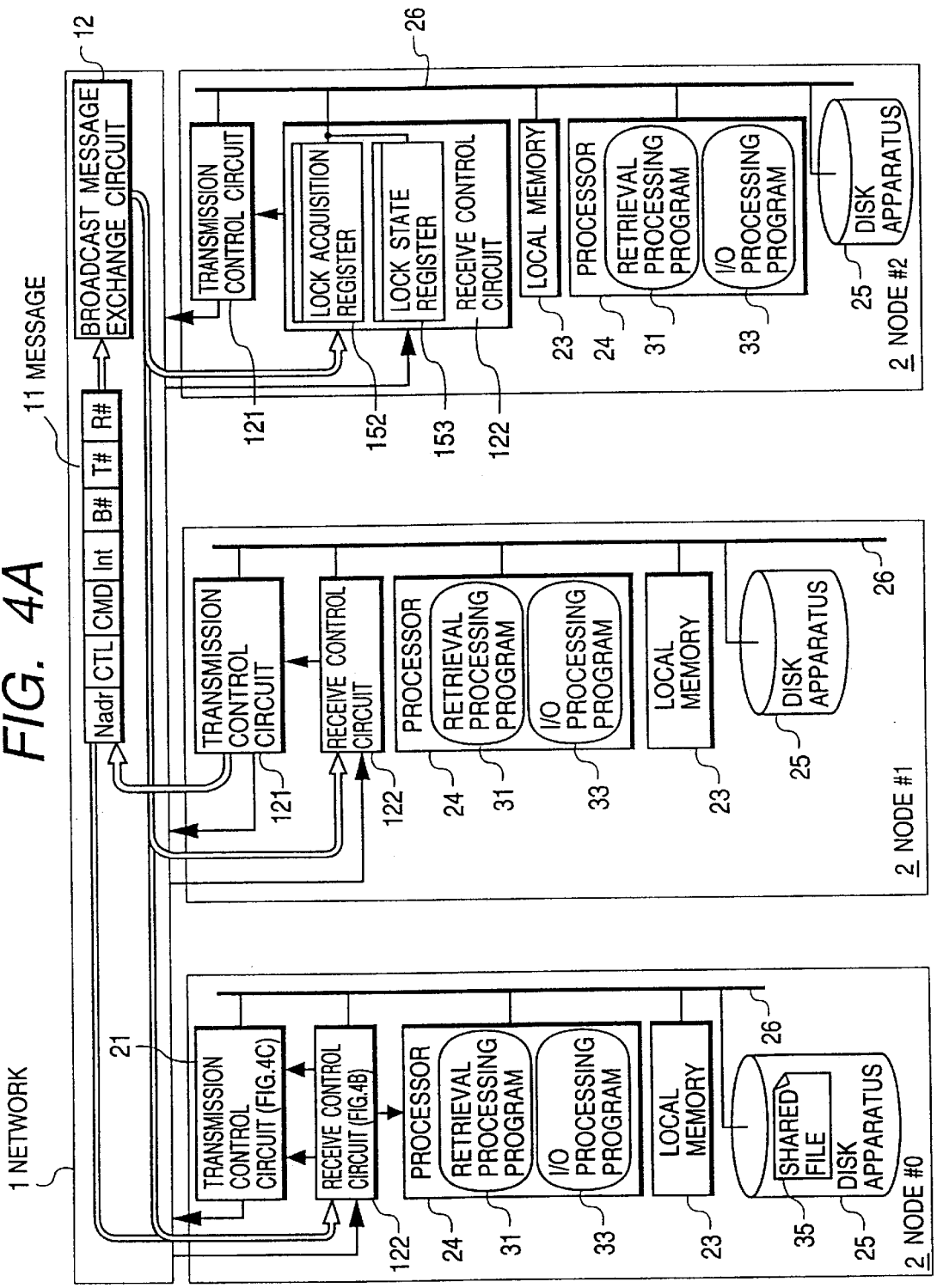

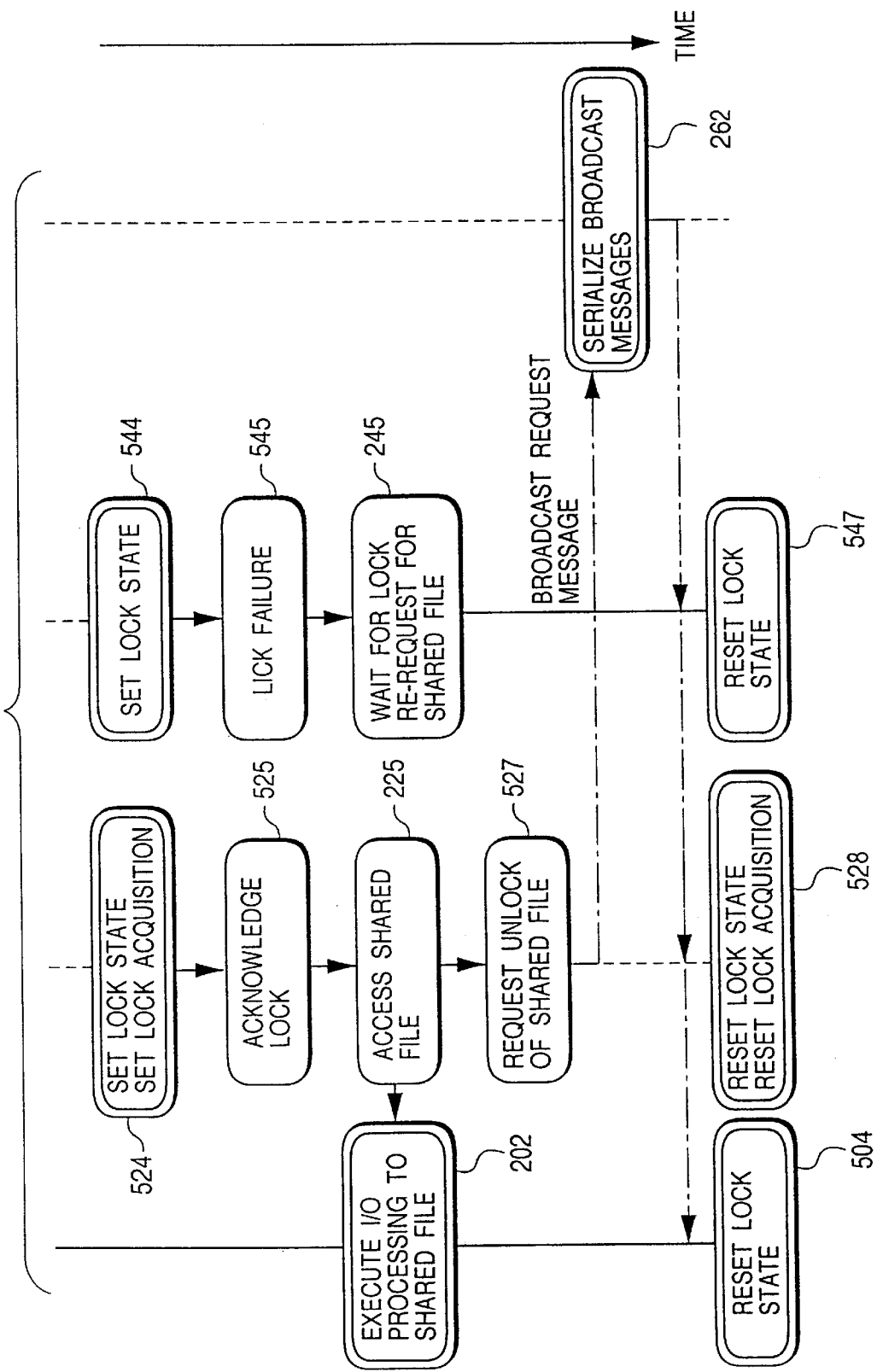

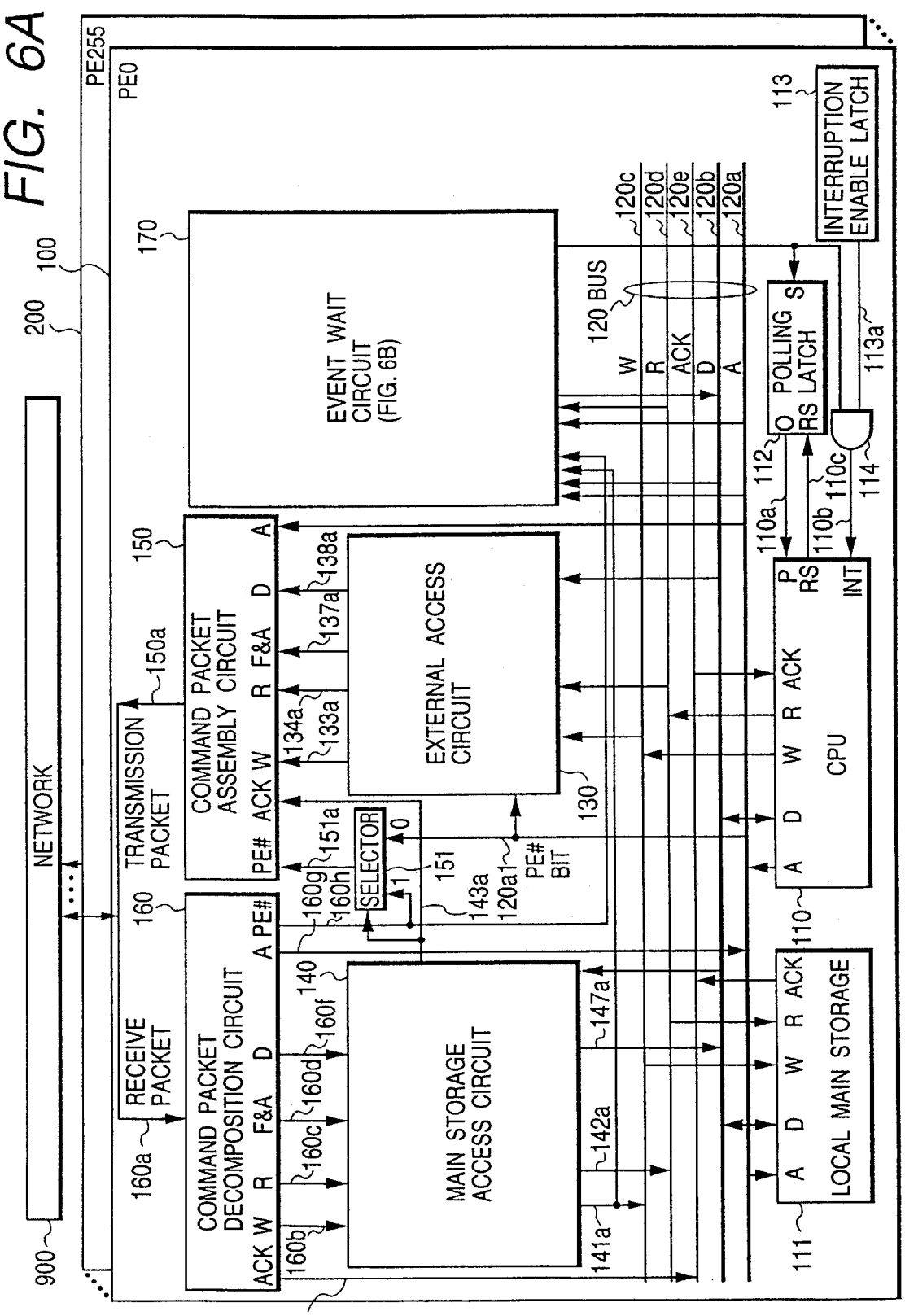

140 MAIN STORAGE ACCESS CIRCUIT

130 EXTERNAL ACCESS CIRCUIT

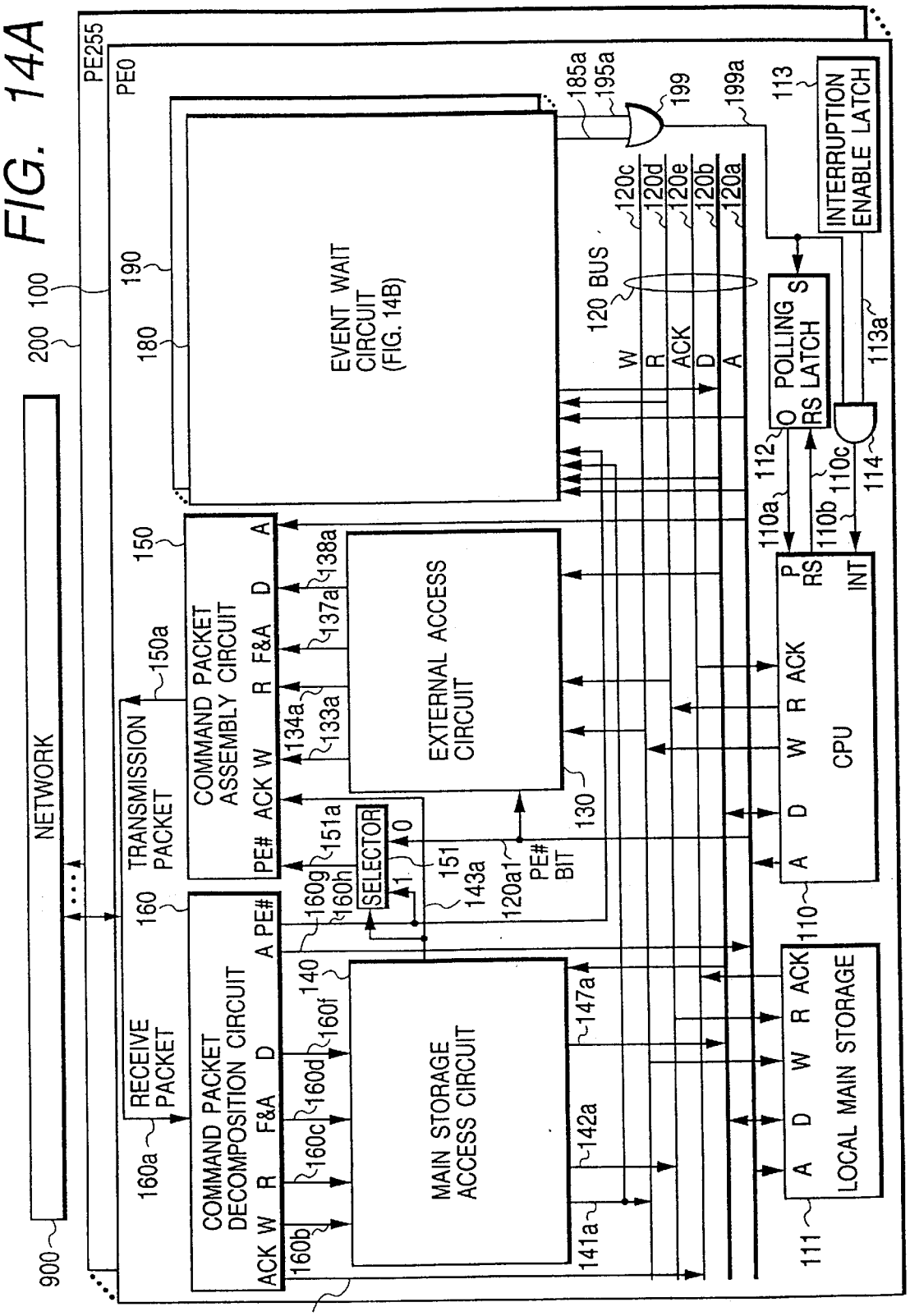

EXCLUSIVE CONTROL METHOD WITH EACH NODE CONTROLLING ISSUE OF AN EXCLUSIVE USE REQUEST TO A SHARED RESOURCE, A COMPUTER SYSTEM THEREFOR AND A COMPUTER SYSTEM WITH A CIRCUIT FOR DETECTING WRITING OF AN EVENT FLAG INTO A SHARED MAIN STORAGE

This is a continuation of application Ser. No. 08/676,053, filed Jul. 5, 1996 now U.S. Pat. No. 5,774,731; which is a continuation-in-part of Ser. No. 08/408,561, filed Mar. 22, 1995 now U.S. Pat. No. 5,822,605.

BACKGROUND OF THE INVENTION

The present invention relates to an exclusive control method and circuit for controlling conflicting access requests to a resource shared by processors making up a computer system, and to an event communication method and circuit for communicating events among these processors by way of a main memory shared thereby.

One representative database system for searching a large-scale database at high speed is a database system operating on a parallel computer system comprising of plural processors. Another large-scale, high-speed database system is a distributed database system run on a client-server type distributed processing system including plural computers. In the present specification the computer elements for executing distributed processing of the distributed processing system may be called nodes, when both processor elements constituting the parallel computer system and computers making up the client-server type distributed processing system are referred to.

In the distributed database system, the database is retained in disk apparatuses in a distributed manner. Plural nodes process a retrieval request from a user in cooperation. That is, the multiple nodes access the disk apparatuses holding different portions of the database designated by the retrieval request in parallel, and process the database portions are. In this operation, plural access requests may be issued from plural nodes to the same database portion. In that case, it is necessary to control these accesses exclusively, so that a series of access requests from the same node are allowed to be completed and access requests from other nodes are prohibited before completion of the former access requests, if the results of accesses for these access requests are to be guaranteed.

Meanwhile, the parallel computer system needs to communicate efficiently occurrence of events among numerous processor elements (abbreviated to a PE hereunder) operating in parallel. It is particularly necessary to communicate events at high speed in executing such nondeterministic processes as database retrieval or knowledge processing, because a large number of asynchronous events are exchanged among PE's. Enhancement of the event processing speed is also needed in order to implement high-speed barrier synchronization and like between PE's, described, in executing routine programs such as one for numerical computation later.

SUMMARY OF THE INVENTION

One disadvantage of the prior art related to exclusive control that is large overhead related to resource access arbitration in a resource managing node comprising a resource accessible by other nodes, and the retrieval processing initially intended to be performed by the resource managing node is such interfered by this arbitration. In addition, conventional event communication methods have the deficiency that overhead for event detection is large and performance of each PE tends to be degraded.

It is therefore an object of the present invention to provide an exclusive control method and a computer system for high-speed arbitration, so that one of plural exclusive use requests issued by plural nodes for the same resource is selected rapidly.

It is a specific object of the present invention to provide an exclusive control method and a computer system which enable arbitration of plurality of exclusive use requests issued from nodes for a resource managed by one node be executed by a circuit other than the processor of the node, thereby reducing the arbitration time and the load of the processor.

It is another object of the present invention to provide a computer system adapted in eliminating superfluous operations of accessing the main storage where no flag is written, when event flags posted via a shared main storage are detected by periodic polling.

It is a further object of the present invention to provide a computer system adapted in reducing the number of flag areas to be accessed, when event flags posted via a shared main storage are detected either by periodic polling or by polling on the occasion of writing of a flag.

It is an even further object of the present invention to provide a computer system capable of reducing overhead in detecting a value of the same event flag by polling, where the flag value may be changed by other PE's via a shared main storage.

In achieving the foregoing objects of the present invention regarding exclusive control, each node stores use status information on exclusive use state of a resource usable by the nodes. When one node is to issue an exclusive use request requesting for the resource, it is judged whether the resource is in exclusive use state on the basis of the use state information stored in the one node.

If the resource is in an exclusive use state, the one node is inhibited from issuing the exclusive use request; if the resource is not in an exclusive use state, the node is allowed to issue the exclusive use request.

Exclusive use requests issued by nodes are transmitted over a network to an exclusive use arbitration circuit accessible by these nodes. Of the transmitted exclusive use requests, one that will exclusively use the resource is selected by the arbitration circuit.

When one exclusive use request is selected by the arbitration circuit, the use state information stored in each node regarding the resource is updated to new use state information indicating that the resource is now in exclusive use state.

According to the exclusive control method of the present invention superfluous exclusive use requests are suppressed, and amount of arbitration processing on such useless requests is reduced, because an access requesting node issues an access request after detecting in that node that the resource is not in exclusive use state.

In a computer system for executing the exclusive control method mentioned above, the arbitration circuit composed of one provided in common to nodes constituting the network. This arbitration circuit judges whether or not to grant exclusive use to an exclusive use request issued by one of the nodes.

In a preferred mode of a computer system according to the present invention, the arbitration circuit comprises plural arbitration circuits distributed in the nodes. Each node using its arbitration circuit judges whether or not to grant exclusive use to the exclusive use request issued by the node.

In another preferred structure of a computer system according to the present invention, the arbitration circuit comprises an arbitration circuit located in a node having the resource. On the basis of the use state information stored in the node about the resource, the arbitration circuit judges whether or not to grant exclusive use to the exclusive use request issued by the one node. The result of the judgment is notified to all nodes.

In achieving the foregoing objects of the present invention related to event communication, a computer system according to the present invention comprises: an area judgment circuit responsive to a write request issued by one of the processing units, for judging whether a storage location in a main storage designated by the write request is one of flag areas each of which is provided in correspondence to one of processing units and into each of which to write a flag indicating occurrence of an event; a polling register provided in correspondence to each processing unit and accessed repeatedly by the each processing unit; and a write circuit for writing information indicating occurrence of an event into the polling register corresponding to one of the processing unit when the storage location designated by the write request is judged by the area judgment circuit as one of the flag areas provided to the one processing unit.

In the above computer system, useless accesses to the flag areas are prevented in cases where no flag has been written to any of these flag areas, because each processing unit polls the flag areas in the main storage only when the information indicating occurrence of an event is set in the polling register.

A further mode of a computer system according to the invention further comprises a storage device provided in correspondence to each processing unit, for holding an address of the storage location designated by that write request when the storage location designated by a write request is judged by the area judgment circuit as one of the flag areas provided for the each processing unit.

The storage device can hold addresses and is accessible by the each processing unit.

The processing unit notified of the storage location address selectively accesses only the flag area having the address held by the storage device but need not access any other flag areas where no flags are written.

Another preferred mode of a computer system according to the present invention, further comprises a storage device provided in correspondence to each processing unit for holding the processing unit number of a processing unit having issued the write request. This storage device can hold plural processing unit numbers, and can be accessed by the each processing unit. The storage device enables the each processing unit to judge easily which processing unit has written a flag. Writing of flags can be distinguished by use of the storage device, even when plural processing units have successively written flags into the same flag area.

A still further mode of a computer system according to the present comprises: a read request circuit responsive to an atomic access request which requests execution of an operation on data held in a main storage and writing of a result of the operation into the main storage, for supplying the main storage with a read request requesting data be read from a storage location in the main storage which has an address designated by the atomic access request; an operating unit for performing the operation designated by the atomic access request on the data read from the main storage according to the read request; a write request circuit for supplying the main storage with a write request requesting that operation result data provided by the operation unit be written into that storage location in the main storage; a value judgment circuit for judging whether the operation result data has a predetermined value indicating occurrence of an event; an area judgment circuit responsive to the write request, for judging whether the storage location having an address designated by the atomic access request is one of flag areas each provided in correspondence to one of the processing units and is to each of which to write a flag for informing occurrence of an event; and an informing circuit responsive to judgment by the value judgment circuit that the operation result data has the predetermined value and to judgment by the area judgment circuit that the storage location designated by the write request is one of the flag areas provided in correspondence to one of the processing units, for informing that one processing unit of occurrence of an event.

In the above computer system, it is possible to inform the one processing unit of occurrence of an event, when the written flag value reaches a predetermined value, in case flags are written repeatedly into the same flag area, and the flag value is changed every time a write operation is carried out.

The present invention outlined above applies preferably where a shared main storage is distributed among the PE's but applies to other cases.

These and other objects, features and advantages of the invention will become more clear upon reading of the following description and appended drawings.

BRIEF DESCRIPTION OF THE DRAWINGS

FIG. 1A is a schematic block diagram of a parallel computer system embodying the invention;

FIG. 3A is a partial flowchart of processing of an access to a shared file in the embodiment of FIG. 1A;

FIG. 3B is another partial flowchart of the processing of the access to the shared file in the embodiment of FIG. 1A;

FIG. 4A is a schematic block diagram of another parallel computer system embodying the invention;

FIG. 5B is another partial flowchart of the processing of the access to the shared file in the embodiment of FIG. 4A;

FIG. 6A is a schematic block diagram of another parallel computer system embodying the invention;

FIG. 14A is a schematic block diagram of another parallel computer system embodying the invention.

DESCRIPTION OF THE PREFERRED EMBODIMENTS

Figure 1B:
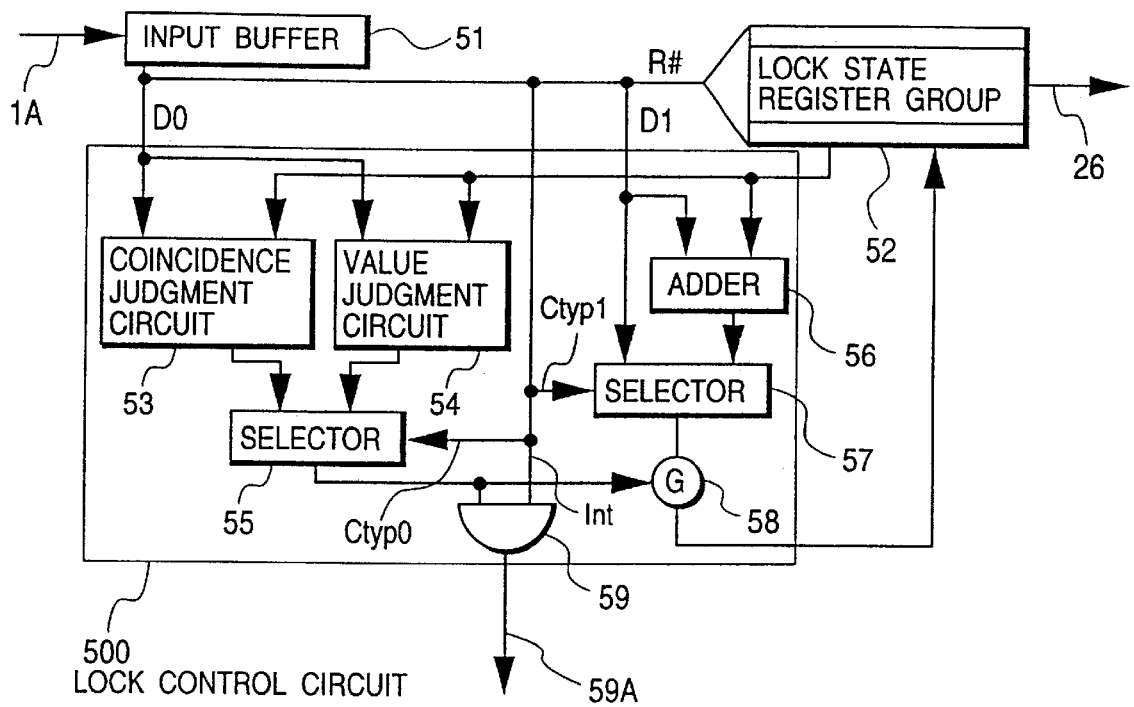
FIG. 1B is a schematic block diagram of a receive control circuit for use in the embodiment of FIG. 1A.

Before computer systems according to the invention are described, prior art related to exclusive control and its disadvantages will be discussed in detail.

A number of methods are known by which to constitute a distributed database system. See, for example, Reference 1, Masai et al., "UNIX-oriented DBMS developed for parallel execution of updates-improving efficiency of parallel processing through load distributing function" (Nikkei Electronics, No. 630; Feb. 27, 1995 issue; pp. 67–75). In particular, two methods, i.e., shared-everything method and shared-nothing method, are known for their efficiency in arbitrating accesses and for their simplicity in building a system. According to the shared-everything method, a main storage and disk apparatuses for storing data are connected to a common bus to which nodes are connected. Each node can access any of the disk apparatuses via the common bus. Generally, a bottleneck of the shared-everything method based on the common bus connection stems from the data transmission performance of the common bus, so the number of nodes that may be connected to the single common bus is largely limited. According to the other method, i.e., the shared-nothing method, neither the main storage nor the disk apparatuses are shared by nodes. Instead, the disk apparatuses are distributed in different nodes. Each disk apparatus may be accessed directly only by the node it belongs to. If any other node is to access the disk apparatus, that node requests the particular node to access the disk apparatus on its behalf. That is, when a file stored on a disk apparatus shared by a plurality of nodes needs to be accessed, the only node that may directly access the disk apparatus is the one physically connected to that disk apparatus (that node is called a resource managing node). Any other node (called an access requesting node) not physically connected to the disk apparatus, when to access a file within the disk apparatus, that other node issues an access request to the resource managing node via message exchanging means such as a network and accesses file indirectly via the resource managing node.

With the shared-nothing method, it is relatively easy to improve performance of the system by increasing the number of nodes in order. Furthermore, performance of access to shared resources is high if performance of the resource managing nodes for handling access request messages and the message exchanging means between nodes are high.

Under the shared-nothing method, as described, the disk apparatus of each node cannot be accessed physically by any other node. So, a file on the disk apparatus is not shared physically by any other node; such a file is accessed by other nodes through the corresponding resource managing node of the file. In the description below, a resource which may be accessed indirectly by other nodes among files and other resources of each node in the shared-nothing method will be called a shared resource. More specifically, a file which may be accessed indirectly by another node, among the files of each node will be called a shared file.

Where the conventional shared-nothing method outlined above is applied to a distributed database system, the following problem arises: if a plural nodes attempt to access simultaneously a shared file held in the disk apparatus of one resource managing node, access requests from these access requesting nodes conflict for the same file. Exclusive control on the shared file is needed to resolve such access conflict. If the conventional method for processing lock requests is applied to the distributed database system operating on the shared-nothing method, plural access requesting nodes issue lock requests to the resource managing node before issuing access requests to the latter.

More specifically, before accessing a shared file, access requesting nodes simultaneously transmit lock requests for locking the shared file to the resource managing node and interrupts it. The resource managing node suspends the ongoing retrieval processing, interprets the lock requests to ascertain that they are requesting locking of the shared file, and arbitrate them to grant one of the requests. Usually, parallel processing server method (i.e., concurrent server method) is used in a client-server type processing utilizing remote procedure calls. According to this method, when a service request is given by a client, a server starts a child process that offers its service to the client and prepares for the next service request. When two service requests arrive at the server substantially at the same time, the server starts two child processes so that these processes offer their services to the respective clients. If this method is applied to the distributed database system operating on the shared-nothing method, there is a possibility that two child processes will issue two lock requests to the same shared file. As a result, there arises the need to arbitrate the two child processes to deal with the lock requests.

After arbitration of the lock requests, each child process sends "lock grant" to the access requesting node that received the lock right through arbitration, and returns "lock rejection" to the other access requesting nodes. When processing of the child processes has ended, the interrupted retrieval processing is resumed.

The access requesting node that received lock grant accesses the shared file and continues to perform retrieval. When access to the shared file has all ended, the access requesting node transmits a shared file unlock request to the resource managing node and interrupts it. In turn, the resource managing node again suspends the ongoing retrieval processing, interprets the unlock request, and unlocks the shared file accordingly. When the unlocking of the shared file has ended, the interrupted retrieval processing is resumed. Meanwhile, the access requesting node having received lock rejection waits for a predetermined wait time, to expect completion of an access by the lock-granted access requesting node to the shared file. When the wait time has elapsed, the access requesting node issues a lock request to the shared file again.

As described, where the conventional lock request processing method is applied to a parallel database processing system operating on the conventional shared-nothing method, the disadvantage is recognized that the progress of the retrieval processing undertaken by the resource managing node is hampered, because the resource managing node needs to interpret a lock request, execute the lock request, interpret an unlock request and execute the unlock request.

With the above aspects of the related art taken into account, the present invention will now be described in detail with reference to a computer system according to the present invention. In the description that follows, like reference numerals designate like or corresponding parts throughout.

First Embodiment
(1) Outline of the System

FIG. 1A shows a parallel computer system according to the present embodiment. In this parallel computer system, plural nodes 2 are connected by a network 1. In FIG. 1A, only three nodes (nodes #0 through #2) are shown for the sake of simplicity. Each node includes at least one processor 24 and a disk apparatus 25. The disk apparatus retains one or plural shared files each used as a shared resource by the nodes. Each shared file may be accessed only through the node that retains the file (i.e., resource managing node). Any other node (i.e., access requesting node) wanting to access the shared file issues a file read request or a file write request to the resource managing node, thus requesting the latter to execute the access request on its behalf. Before using a shared resource, each node needs to acquire the right to use the resource exclusively so that no other node will attempt to use it. After using the resource, the node must relinquish the exclusive use right.

In a conventional shared-nothing system, when access requesting nodes request exclusive use of the resource managed by a resource managing node, these access requesting nodes issue lock requests to the resource managing node. The resource managing node arbitrates the plurality of lock requests, to select one of them and locks the resource for exclusive use by the selected access requesting node. That is, the conventional processing of lock requests entails both arbitration of exclusive use requests and the subsequent locking of the resource. With the present embodiment, by contrast, access requesting nodes issue lock requests if the resource is not being locked, but do not issue lock requests if the resource is already locked. Lock requests are arbitrated by a circuit other than the resource managing node. Furthermore, after arbitration of the lock requests, the resource is not locked. Thus, in the present embodiment differs from the prior art in a manner of using the shared resource. In the present embodiment, however, the traditional wording "lock(ing)" in such expressions as a lock request or a lock state. In the present embodiment, "lock (ing)" means exclusive use. Illustratively, the "lock state" signifies an exclusive use status. The above usage of the word "lock(ing)" also applies to the other embodiments and their variations.

In the present embodiment, the lock status of the shared resource in each node is managed by all nodes including the node managing the shared resource, which is one of the characteristics. To implement this feature, each node 2 have a lock state register group 52 and a lock control circuit 500 which are specific to the present embodiment. The lock state register group 52 comprises registers for managing the lock states of all shared resources within the parallel computer system, each register corresponding to a unit of resource to be locked. The present embodiment regards each node as a unit of lock. That is, if each node has shared resources, these resources are locked collectively. This means that in the present embodiment, each register constituting the lock state register group 50 corresponds to one node. If any one node is not locked, the corresponding lock state register retains information indicating the node is in an unlocked state; if a given node is locked, the corresponding lock state register retains information identifying a node that had the node in the locked state be locked.

Where a program running on a given node wants to lock any other node, the program checks the lock state register group 52 to see if the target node is already locked. If the target node is locked, the program is inhibited from issuing a lock request. This eliminates wasteful lock requests that would be issued conventionally to a file which is already locked. Also, eliminated concomitantly is processing in the resource managing node dealing with useless lock requests.

When plural nodes request locking of the same shared resource, one of their lock requests need to be selected through arbitration. The present embodiment performs such arbitration using the lock control circuit 500 provided in each node and a broadcast message exchange circuit 12 provided in the network 1. When any one node 2 wants to access any shared file, the node 2 transmits over the network 1 a broadcast request message to the broadcast message exchange circuit 12. The message includes, as broadcast information, a lock request, ID information identifying the relevant resource managing node, and ID information identifying the access requesting node.

Upon receipt of the broadcast request message, the broadcast message exchange circuit 12 generates a broadcast message including the broadcast information, and broadcasts the generated broadcast message to all nodes over the network 1. If different nodes 2 transmit plural broadcast request messages to the broadcast message exchange circuit 12, the circuit 12 sequentially responds to these messages. In other words, the broadcast message exchange circuit 12 is a serialization circuit for serializing plural broadcast request messages received. The broadcast message which includes a lock request and which is broadcast by the broadcast message exchange circuit 12 is transmitted to all of the nodes 2 over the network 1. Each node 2 judges whether the lock request in the broadcast message is to be granted.

In the first embodiment, each node is constructed so as to give a lock grant on a first-come first-served basis for the sake of simplicity, when plural broadcast messages including plural lock requests requesting locking of the same resource are transferred to each node. However, this is not limitative of the invention and any other appropriate way may be used to select a lock request to which a lock grant is given. When a new lock request is given a lock grant, the lock control circuit 500 of each node updates the lock state register group 52. The broadcast message exchange circuit 12 supplies the node with lock requests provided from different nodes in the same sequence. Therefore, a lock request which has been given a lock grant by the lock control circuit 500 in each node is the same with every node. In this manner, the processor 24 of each node finds out the newly locked resource managing node and the node that has succeeded in having the resource locked. Therefore, the node 2 that issued one of the broadcast request messages containing a lock request can detect whether the node has succeeded in having the target resource locked. If the node has detected its success in having the desired resource managing node locked, the node then issues a message comprising a file access request to the resource managing node.

Conventionally, plural access requesting nodes issue lock requests to a resource managing node which in turn suspends the ongoing program to process the lock requests. With the present embodiment, by contrast, the broadcast message exchange circuit 2 serializes the lock requests. After arbitration, each node manages the lock states of resources. This eliminates the need for any resource managing node to process lock requests, whereby the burden of processing by each resource managing node is alleviated.

The circuits and their operations in the first embodiment will now be described in more detail.

(2) Nodes 2

As shown in FIG. 1A, each node 2 comprises a processor 24 that executes programs such as a retrieval processing program 31, a local memory 23, a disk apparatus 25 that stores a database portion assigned to the node, and a transmission control circuit 21 and a receive control circuit 22 for the high-speed lock processing, the latter two being specific to the first embodiment. This parallel computer system is what is known as a distributed memory type parallel computer system in which the local memory 23 stores programs to be executed by the node as well as data to be used or generated by such programs. The local memory 23 of each node is not physically shared by other nodes and can only be accessed directly by the node to which the memory belongs. The circuits within the node are connected to a system bus 26, and are accessed by the processor 24 in the same manner as the local memory 23 in accordance with the so-called memory-mapped I/O method using memory access instructions such as a load and a store instruction.

As described, the present embodiment is a shared-nothing system in which the disk apparatus of each node cannot be accessed physically by any other node. Thus, a file 35 in the disk apparatus 25 is not shared physically by any other node except the node including the disk apparatus. Instead, the file 35 may be accessed by the resource managing node #0 on behalf of other nodes (#1 and #2). It is in that sense that those files or other resources of each node which may be shared indirectly by other nodes are called shared resources in the present or other embodiments. A file 35 of a given node allowed to be accessed by other nodes in the manner described is specifically called a shared file.

Figure 1C:
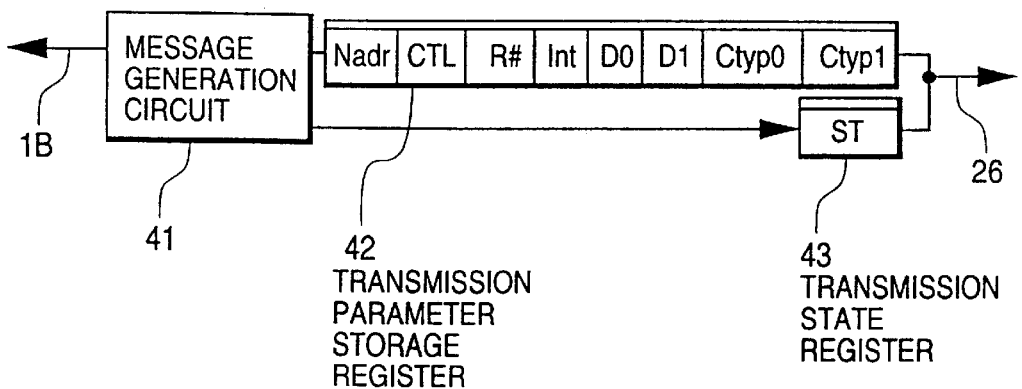
FIG. 1C is a schematic block diagram of a transmission control circuit for use in the embodiment of FIG. 1A.

As depicted in FIG. 1C, the transmission control circuit 21 of each node comprises a message generation circuit 41, a transmission parameter storage register 42 and a transmission state register 43. The receive control circuit 22 of each node includes an input buffer 51, a lock state register group 52 and a lock control circuit 500. The lock control circuit 500 is made up of a coincidence judgment circuit 53 that judges whether two inputs coincide with each other, a value judgment circuit 54 that compares values of two inputs, an adder 56 that adds up two inputs, selectors 55 and 57, a gate circuit 58, and an AND circuit 59.

(3) Network 1

Figure 2:
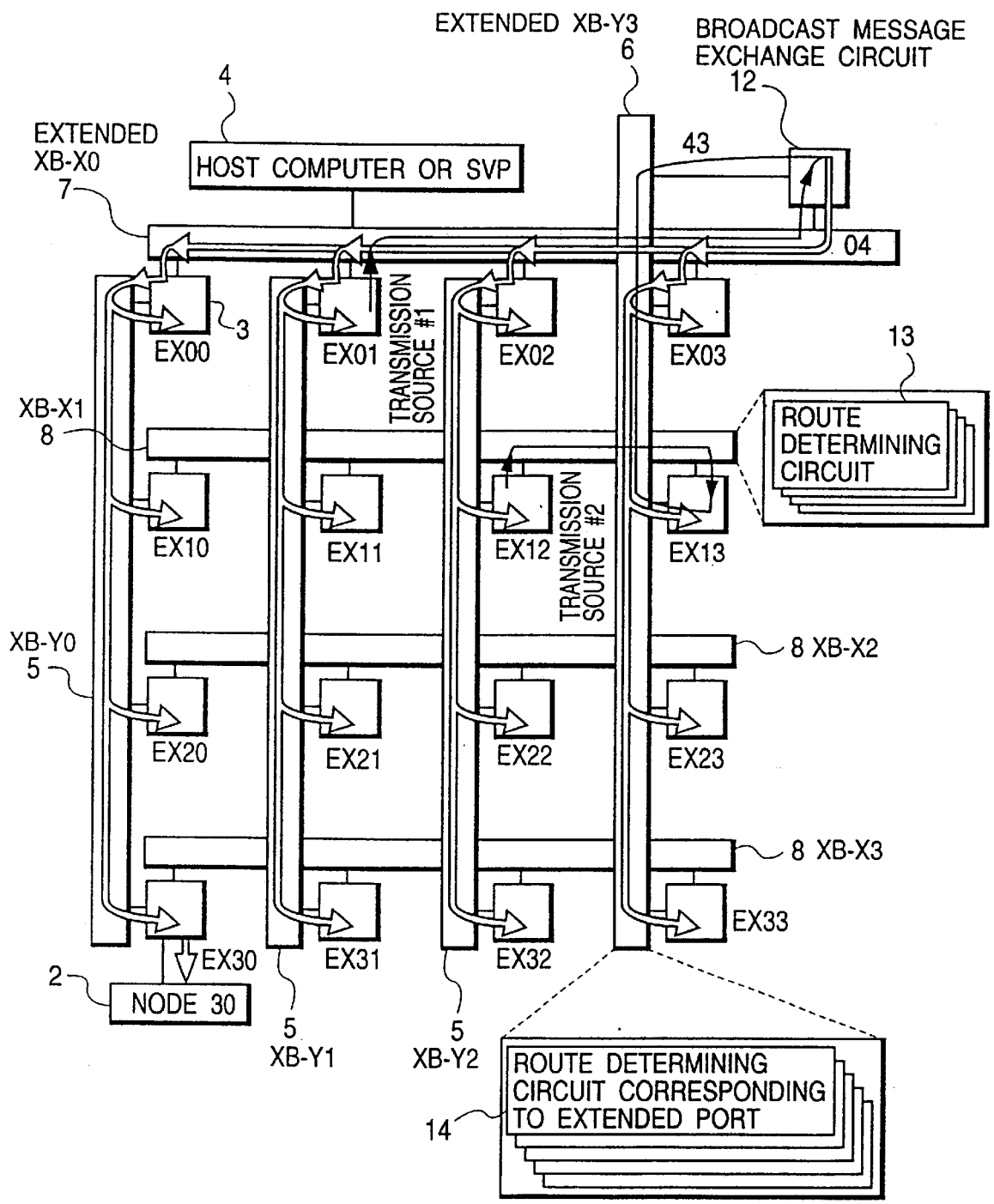
FIG. 2 is a schematic block diagram of a network for use in the embodiment of FIG. 1A.

The network 1 is the same as that described in Japanese Patent Application No. Hei 6-53405 (later laid open (on Oct. 13, 1995) as Japanese Patent Laid-Open No. Hei 07-262155) or in the corresponding U.S. patent application Ser. No. 08/408,561. The contents of this U.S. patent application regarding the network and its related circuits are incorporated herein by reference. As shown in FIG. 2, the network 1 is basically composed of a plurality of crossbar switches 7 and 8 and a plurality of exchange switches constituting what is known as a hyper-crossbar switch. The crossbar switches comprise a plurality of X direction crossbar switches 7 or 8 and a plurality of Y direction crossbar switches 5 or 6. Each node 2 is connected via the corresponding exchange switch to one X direction crossbar switch 7 or 8 and to one Y direction crossbar switch 5 or 6. Each exchange switch 3 exchanges messages among the node, X direction crossbar switch and Y direction crossbar switch all connected to that exchange switch 3.

Each node 2 is given a combination of X and Y coordinates (XY) designating a lattice point in a two-dimensional space. An X direction crossbar switch connects a group of nodes 2 whose Y coordinate is an identical value and whose X coordinates are different; a Y direction crossbar switch connects a group of nodes 2 whose X coordinate is an identical value and whose Y coordinates are different. The X direction crossbar switch 7 to which the broadcast message exchange circuit 12 is connected has one more I/O port than the other X direction crossbar switch 8. The same applies to the Y direction crossbar switch 5 to which the broadcast message exchange circuit 12 is connected. For this reason, the X direction crossbar switch 7 having the extra I/O port connected thereto may be called an extended crossbar switch or extended XB-X0; the Y direction crossbar switch 5 with the extra I/O port may likewise be called an extended crossbar switch or extended XB-Y3. The other X direction crossbar switches 8 may be called XB-X1, XB-X2 and XB-X3; the other Y direction crossbar switches 6 may be called XB-Y0, XB-Y1 and XB-Y2. Each exchange switch may be called EXij, the suffix "ij" representing the coordinates of the corresponding node. Each X direction crossbar switch 8 or Y direction crossbar switch 5 has as many route determining circuits 13 as the number of I/O ports for transmitting a message coming from any one exchange switch 3 in accordance with the address held in that message. The extended crossbar switch 7 or 6 also has route determining circuits 14 corresponding to the extended port arrangement.

(4) Broadcast Message Exchange Circuit 12

The broadcast message exchange circuit 12 is also the same in constitution as that described in the above-cited Japanese Patent Application No. Hei 6-53405 or in the corresponding U.S. patent application Ser. No. 08/408,561. In operation, the broadcast message exchange circuit 12 serially selects broadcast request messages sent thereto, changes the selected broadcast request message into a broadcast message incorporating the broadcast information included in the initial message, and broadcasts the selected message to all of the nodes over the network 1. Generally, the broadcast message exchange circuit 12 is used to prevent the network 1 from getting deadlocked with broadcast messages as disclosed in the above cited patent applications. In addition to that use, the present embodiment utilizes the broadcast message exchange circuit 12 as a serialization circuit for serially selecting a plurality of broadcast request messages from a plurality of access requesting nodes, each message including a lock request.

The broadcast message exchange circuit 12 is furnished independently of the exchange switch 3 to which nodes 2 are connected. The broadcast message exchange circuit 12 is connected to an extended I/O port (having address 04 in this example) of the extended crossbar switch 7 which is one of the X direction crossbar switches, and to an extended I/O port (with address 43) of the extended crossbar switch 6, one of the Y direction crossbar switches. Suppose that an access requesting node directly connected to an exchange switch (e.g., exchange switch EX12) coupled to an X direction crossbar switch 8 (e.g., XB-X1) other than the extended X direction crossbar switch 7 is to transmit a broadcast request message including a lock request to the broadcast message exchange circuit 12. In that case, the access requesting node transmits the broadcast request message containing, as its message destination address, the extended port address "43"

of the extended Y direction crossbar switch 6. This message is transmitted to the broadcast message exchange circuit 12 by way of the crossbar switch XB-X1, an exchange switch (e.g., EX13), the extended Y direction crossbar switch 6, and the extended I/O port 43. On the other hand, suppose that an access requesting node directly connected to an exchange switch (e.g., exchange switch EX01) coupled to the extended X direction crossbar switch 7 is to transmit a broadcast request message including a lock request to the broadcast message exchange circuit 12. In this case, the node transmits the broadcast request message containing, as its message destination address, the extended port address "04" of the extended X direction crossbar switch 7. This message is transmitted to the broadcast message exchange circuit 12 by way of the extended I/O port of the crossbar switch 7.

As described in the above-cited Japanese Patent Application No. Hei 6-53405 or in the corresponding U.S. patent application Ser. No. 08/408,561, the broadcast message exchange circuit 12 comprises: two input buffers (not shown) connected to two input ports having addresses "04" and "43" respectively; a selector (not shown) for selecting one of the two buffers; a priority circuit (not shown) for determining the selection of one of the two input buffers and instructing the selector to execute the selection; a control bit change circuit (not shown) for replacing the control (CTL) bit in the broadcast request message selected by the selector with that of a broadcast message; and an output buffer (not shown) for outputting to the output port 04 of the network 1 a broadcast message which includes both the control bit changed by the control bit change circuit and the broadcast information contained in the broadcast request message.

As described, upon receipt of the transmitted broadcast request message, the broadcast message exchange circuit 12 gets the control bit change circuit to change the received message into a broadcast message and forwards the message to the extended I/O port with address 04 of the extended X direction crossbar switch 7. The route through which the broadcast request message is transmitted varies depending on where the access requesting node is located. This is to prevent the route of the broadcast message derived from a broadcast request message from interfering with the route of the broadcast request message, thereby avoiding possible deadlock stemming from routing conflict. When two broadcast request messages are received simultaneously, the priority circuit selects the messages one at a time.

In the manner described, the broadcast message exchange circuit 12 places broadcast request messages serially onto the network 1, and the messages are distributed to all nodes through the same transmission route. In this network where one message never overtakes another halfway through transmission, the sequence in which broadcast messages arrive at all nodes is the same for all nodes. The lock requests output by different nodes are sent to all nodes in the sequence selected by the broadcast message exchange circuit 12. With the present embodiment, as will be explained later, each resource managing node processes, as the successful lock request, the lock request contained in the first of the broadcast messages (each including a lock request) that have arrived at the same node. The initially processed lock request is given lock grant in locking the shared file within the resource managing node. The lock requests of the broadcast messages that have subsequently arrived at the resource managing node are thus prevented from locking the shared file. Since the broadcast message exchange circuit 12 of the present embodiment allows broadcast request messages to arrive at every node in the same sequence, each node gives lock grant to the lock requests provided by the same access node.

(5) Binary Semaphore

The present embodiment allows any shared file to be locked using the lock state register group 52 in the receive control circuit 22 of all nodes as a binary semaphore. The binary semaphore is utilized where one of concurrent requests is to be selected for acquisition of the shared resource. Starting from an initial value of 0, the binary semaphore involves use of two kinds of operation: P operation to lock, and V operation to unlock.

P(X): "if X=0 then X:=1" . . . P operation

V(X): "if X=1 then X:=0" . . . V operation

Each operation is carried out illustratively using a test-and-set (T & S) instruction. The resource is locked by the P operation setting the binary semaphore X to 1. The resource is unlocked by the V operation resetting the binary semaphore X to 0.

The present embodiment performs the above operations in conjunction with the lock state register group 52 used as the binary semaphore for all nodes. This constitutes a shared-nothing system allowing shared files to be locked and unlocked as needed.

(6) Initialization of the Lock State Register Group 52

Before starting their operations, all nodes initialize their lock state register groups 52. During initialization, each node 2 causes the processor 24 to set zero via the system bus 26 to all registers in the lock state register group 52 using a store instruction. All registers having a value 0 in the lock state register group 52 indicate that all nodes are currently unlocked.

(7) Processing of Lock Requests

Described below with reference to FIGS. 3A and 3B is how the shared file 35 held on the disk apparatus 25 connected to the resource managing node #0 is locked when accessed by access requesting nodes #1 and #2 in a substantially simultaneous manner. In FIG. 3B, the processes encircled in double line (e.g., step 261) are those executed by hardware, and the processes encircled in single line are those carried out primarily by the processor 24 executing programs.

Initially, the resource managing node #0, access requesting node #1 and access requesting node #2 cause their respective processors 24 to perform the retrieval processing program 31 using the local memory 23 and disk apparatus 25 each (steps 201, 221 and 241). When it becomes necessary for the access requesting nodes #1 and #2 almost simultaneously to access the shared file 35 on the disk apparatus 25 of the resource managing node #0 for exclusive use of the resource (steps 222 and 242), each node issues a shared file lock request (steps 223 and 243).

(7a) Broadcasting of Lock Request Message

As mentioned, the lock state register group 52 comprises registers for managing the lock states of all shared resources within the parallel computer system embodying the invention. Each of the grouped registers is provided in correspondence to one unit of a lockable resource. With the first embodiment, each node is a unit of lock, i.e., each register in the lock state register group 50 corresponds to one node. Thus in the description that follows, the lock state register applicable to a given node is identified by the number of that applicable node. For example, the lock state register corresponding to the resource managing node #0 is called the lock state register #0.

The access requesting nodes #1 and #2 each check to see if the resource managing node #0 is already locked. The processor 24 of each node reads the content of the lock state register #0 via the system bus 26 to see if the content equals the value of 0. If the value is other than 0, that means the resource managing node #0 is locked. This inhibits a lock request from being supplied. In this manner, the present embodiment prevents each node from issuing any lock request that turns out to be useless.

After verifying that the resource managing node #0 is not locked, the access requesting nodes #1 and #2 each perform the above-described P operation on the lock state register #0 as follows: a broadcast request message 11 is sent to the broadcast message exchange circuit 12 for transmission to all nodes. The message includes the following parameters and requests that the lock state register #0 of each node be set to the lock state:

Nadr (address):=address of broadcast message exchange circuit 12
CTL (control):=broadcast request message enable
R# (register No.):=#0
Int (interrupt):=disable
D0 (data 0):=0
D1 (data 1):=number of access requesting node #1 (or #2)
Ctyp0 (operation type 0):=coincidence judgment enable
Ctyp1 (operation type 1):=set enable "Nadr" is the network address used by the network 1 and indicating the destination of the broadcast request message in question. In this example, the address is either address "04" or address "43" for the broadcast message exchange circuit 12. As described, which of the addresses "04" and "43" is to be used depends on whether or not the access requesting node #1 is connected to the exchange switch coupled to the extended X direction crossbar switch 7. "CTL" is the control bit that denotes the message type. In this example, the CTL bit set for "broadcast request message enable" indicates that the message is a broadcast request message. "R#," which is #0 in this example, is the number of the lock state register corresponding to the resource managing node that has become the target of the lock request. "Int" is a field used if the lock request in the broadcast request message has succeeded in locking the target resource, the field thereupon designating whether or not to inform the access requesting node #1 of the successful locking by interruption. Since the "Int" field is set for "disable" here, no interruption takes place. In this case, as will be described later, whether or not the lock request has been accepted successfully is detected by the processor 24 of the access requesting node #1 checking the content of the lock state register #0 inside the node. If the "Int" field is set for "enable," then the access requesting node #1 checks through interruption to see if the locking attempt has succeeded. "D0" and "D1" are data to be used by the lock control circuit 500 for its operation in each node. In this example, the data "D0" is set for 0 indicating that the lock state register #0 is not locked; the data is used to verify whether the current value of the register #0 is 0. The data "D1" in this example represents the number of the access requesting node #1 (or #2) in effect when the register is successfully locked, the number being thereupon written to the register. "Ctyp0" is a first parameter to designate the operation at each node. In this example, the parameter "Ctyp0" shows that the current value of the lock state register #0 coincides with the data D0. This provides a judgment on whether the register is currently locked. "Ctyp1" is a signal indicating whether or not to write the result of the operation by the lock control circuit 500 to the lock state register #1. In this example, the signal designates writing of the operation result to the register.

In order to transmit the above-described broadcast request message, the processor 24 of the access requesting node #1 writes the above parameters into the transmission parameter storage register 42 via the system bus 26 using a store instruction. The message generation circuit 41 in the transmission control circuit 21 finds out that the parameters above have been written into the transmission parameter storage register 42. In response, the message generation circuit 41 generates a broadcast request message 11 based on the transmission parameters and supplies the generated message 11 onto the network 1 via a line 1B. When the transmission of the broadcast request message to the network 1 has completed, a state flag ST in the transmission state register 43 is set for "transmission complete." Using a load instruction, the processor 24 checks the transmission state register 43 via the system bus 26 to know that the shared file lock request has ended. After verifying that the transmission state register 43 is set for "transmission complete," the processor 24 clears the register 43 using a store instruction in preparation for the next message transmission.

As discussed earlier, the message 11 output onto the network 1 is sent to the broadcast message exchange circuit 12. The access requesting nodes #1 and #2 act in the same manner in issuing their lock requests. The messages transmitted by these nodes are selected serially by the broadcast message exchange circuit 12. The control bit CTL in the selected message is changed from that of the broadcast request message into that of a broadcast message. This broadcast message is broadcast to all nodes over the network 1 (step 261).

As mentioned, the access requesting nodes #1 and #2 request locking of the shared file 35 in a substantially simultaneous manner. Here, it is assumed that the broadcast request message from the access requesting node #1 is selected before the message from the access requesting node #2 by the broadcast message exchange circuit 12 for broadcast to all nodes. This means that, as described, the lock request message from the access requesting node #1 arrives at all nodes before the lock request message from the access requesting node #2.

(7b-1) Arbitration of Lock Requests (lock success case)

Upon receipt of the broadcast message containing the lock request from the access requesting node 1, the receive control circuit 22 of each node acts as follows: the broadcast message coming from the network 1 is placed temporarily into the input buffer 51 via a line 1A. In accordance with the lock state register number #R (#0 in this case) of the message placed into the input buffer 51, the value held in the lock state register #0 (initial value of 0 in this case) is supplied to the coincidence judgment circuit 53, value judgment circuit 54 and adder 56. The data D0 in the received message (value 0 in this case) is supplied to the coincidence judgment circuit 53 and value judgment circuit 54. With its two inputs being 0 each, the coincidence judgment circuit 53 outputs 1. Because the "Ctyp0" field in this message is set for "coincidence judgment enable" in the current example, the output of the coincidence judgment circuit 53 is selected by the selector 55 and that of the value judgment circuit 54 is not selected. Thus the output of the selector 55 becomes active, which in turn causes the corresponding gate 58 to become active. Meanwhile, because the "Ctyp1" field in the received message is set for "set enable," the data D1 in the message (node number # of the access requesting node #1 in this case) is selected by the selector 57 and is supplied to the gate 58. Because the gate 58 is now active, the node number #1 of the access requesting node #1 is supplied from the gate 58 and written into the lock state register #0. Furthermore, because the "Int" field in the received message is set for "disable," the output 59A of the AND gate 59 is negative, which suppresses interruption of the processor 24.

Whereas lock requests are arbitrated as described, it should be noted that in the present embodiment the resource managing node #0 does not lock the resource requested by the lock request selected through the arbitration.

(7b-2) Arbitration of Lock Requests (lock failure case)

The broadcast message including the lock request from the access requesting node #2 is received by each node following the broadcast message containing the lock request from the access requesting node #1. The ensuing process involved is similar to that of the preceding case of successful locking, except that the coincidence judgment circuit 53 does not detect coincidence because the node number of the access requesting node #1 has already been written into the lock state register #0. The output of the coincidence judgment circuit 53 becomes negative, so that the output of the selector 55 and that of the gate 58 also become negative. Thus the gate 58 does not perform a write operation on the lock state register #0. As a result, the access requesting node #1 continues to lock the node #0.

Because plural P operations are performed on the lock state register #0 in the same sequence at every node, exclusive use of the locked resource is guaranteed. During the locking process, the resource managing node #0 does not need to suspend its ongoing processing.

(7c-1) Lock Acknowledgment (lock success case)

The access requesting node #1 having issued the shared file lock request checks the lock state register #0 using a load instruction. When the access requesting node #1 finds out that the content of the lock state register #0 has been changed to its own node number, the successful locking of the shared file is verified (step 224). Thereafter, the access requesting node #1 continuously acquires the right to access the shared file 35 in the resource managing node #0 until the node #1 unlocks the shared file 35.

(7c-2) Lock Acknowledgment (lock failure case)

The access requesting node #2 having issued the shared file lock request checks the lock state register #0 using a load instruction. When the access requesting node #2 finds out that the content of the lock state register #0 has been changed to the node number of the access requesting node #1, the failure to lock the shared file is verified (step 244). Thereafter, the access requesting node #2 is barred from accessing the shared file 35 until the access requesting node #1 unlocks the file.

(7d) File Access

The access requesting node #1 accesses the shared file 35 by sending over the network 1 a message containing an access request to an I/O processing program 32 executed by the processor 24 of the resource managing node #0 (step 225). Upon receipt of the message via the line 1A into the input buffer 51, the resource managing node #0 uses an interrupt circuit (not shown) to supply an interrupt signal to the processor 24. In response, an interruption processing program of the processor 24 activates the I/O processing program 33 designated as the communication destination by the access request. The interruption processing program instructs the I/O processing program 33 to execute the I/O operation requested by the access request on the requested file (step 202). If the access request is a read request, the processor 24 reads relevant data from the disk apparatus 25 and sends a message containing the retrieved data to the access requesting node. If the access request is a write request, the request contains write data which the processor 24 writes into the disk apparatus 25. The processor 24 then sends a message indicating the completion of the write into the access requesting node.

Conventionally, upon receipt of a file access request from another node, a resource managing node generates a coprocess for executing the access designated by the request and controls execution of the coprocess. If the resource managing node receives a plurality of lock requests in parallel from a plurality of nodes regarding the same file on the disk apparatus 25, the resource managing node generates a coprocess for each lock request. Using these coprocesses for access to the same file, the resource managing node arbitrates the lock requests with respect to that file. Specifically, the resource managing node selects one of the coprocesses. Once a coprocess is selected, the conventional lock request process prevents the other coprocesses from using the file so that the selected process will lock the file and use it exclusively until the usage of the file comes to an end.

By contrast, the embodiment does not send any lock request from any access requesting node to any resource managing node. Thus, each resource managing node does not lock its resource. With the embodiment, as described, an exclusive use arbitration circuit located outside the processor of each resource managing node allows only one access requesting node to access the disk apparatus 25 within the same resource managing node. In other words, requests for the exclusive use of the resource are arbitrated outside the processor of the resource managing node. That is, exclusive use requests regarding the same disk apparatus are not supplied to the processor of the resource managing node. Coprocesses for requesting the access to the disk apparatus are not generated in parallel. Thus within the resource managing node devoid of its own lock control measures, attempts from different nodes to access the same disk apparatus will not occur simultaneously. That is, no resource managing node in the embodiment locks its resource. Each node constituting the present embodiment has the lock state register group 52, and checks the relevant register in the register group to see if the desired resource is already locked before accessing it. This scheme thus ensures exclusive use of the same resource by one node only.

(7e) Shared File Unlock Request

The access requesting node #1 having completed its access to the shared file 35 unlocks the file by performing the V operation on the lock state register #0 as follows: a broadcast request message is sent to the broadcast message exchange circuit 12 for transmission to all nodes. This message includes the following parameters:

Nadr:=address of broadcast message exchange circuit 12
CTL:=broadcast request message enable
R#:=#0
Int:=disable
D0:=node number of access requesting node #1
D1:=0
Ctyp0:=coincidence judgment enable
Ctyp1:=set enable The parameters above are the same as those of the previously described broadcast request message containing the lock request except that the contents of the data D0 and D1 are switched. This message is first sent to the broadcast message exchange circuit 12. From there, the message is broadcast to all nodes over the network 1 (step 262). The circuit operations involved are the same as those for the preceding broadcast request message including the lock request.

(7f) Unlocking

Upon receipt of the broadcast message containing the unlock request provided from the access requesting node #1, the receive control circuit 22 of each node gets the coincidence judgment circuit 53 to verify, as in the case of the preceding broadcast message including the lock request, whether or not the lock state register #0 retains the access requesting node number (#0) indicated by the data D0. With the node number #0 found to be retained, the value 0 designated by the data D1 is written into the lock state register #0. This resets the lock state register #0 to its initial value 0, whereby the shared file 35 is unlocked for use by any other node.

Meanwhile, the access requesting node #2 having failed to lock the file as a result of step 244 remains in a wait state before issuing another shared file lock request (step 245). This process is implemented usually by use of a timer function incorporated in the processor 24. Upon elapse of a predetermined period of time, the lock request process (equal to step 243) is again performed. For example, suppose that the access requesting node #2 again issues a lock request before the access requesting node #1 unlocks the lock state register #0. In that case, the attempt to lock the desired node fails because the lock state register #0 still contains the node number of the access requesting node #1 and the P operation on the register is unsuccessful. But if the access requesting node #2 issues a lock request after the lock state register group 52 is freed, then the node number of the access requesting node #2 is set to the lock state register #0. This allows the access requesting node #2 successfully to acquire locking of the desired resource.

In FIG. 1B, the value judgment circuit 54 and adder 56 are not used in the above-explained operations related to locking or unlocking of shared resources, but may be used for other purposes together with other elements shown. So, only simple explanation of their usage will be given below. For example, these elements may be used in controlling the nodes so that a total number of access requesting nodes accessing the same node should not exceed a predetermined limit value. In this usage, each lock state register should be able to hold, instead of lock state information, at least a total number of access requesting nodes which are accessing files belonging to one of the nodes corresponding to the lock status register. The value judgment circuit may be used to judge whether a value held in one of the group of lock state registers is less than a limit value which is designated by a received access requesting message. The adder 56 may be used to increment a value held in one of the lock state registers by one.

As described, the present embodiment allows both lock and unlock requests to be processed without causing the processor of any specific node (e.g., resource managing node) to suspend its ongoing retrieval processing. The retrieval process of any resource managing node is interrupted only during execution of the access request regarding the resource in question. This enhances performance of the system as a whole.

First Variation of the First Embodiment

The first embodiment has been shown to use the broadcast message exchange circuit 12 discussed in the above-cited Japanese Patent Application No. Hei 6-53405 or in the corresponding U.S. patent application Ser. No. 08/408,561. This circuit is not included in the hyper-crossbar network but added anew outside of it. Alternatively, a first variation of the first embodiment implements the same function without recourse to such an additional circuit arrangement.

Japanese Patent Application No. Hei 6-169995 (later laid open (on Mar. 22, 1996) as Japanese Patent Laid-Open No. Hei 08-77127) or the above-cited U.S. patent application Ser. No. 08/408,561 also corresponding to that Japanese application discusses another technique for preventing deadlock on the network. The disclosed technique, which is also incorporated herein by reference, utilizes serialization circuits provided usually in the X direction crossbar networks as well as in the Y direction crossbar networks. Each serialization circuit serially broadcasts broadcast messages transmitted to the crossbar network to which the circuit is connected. This technique forestalls any deadlock on the network using the serialization circuits in the same manner as the broadcast message exchange circuit described in the above-cited Japanese Patent Application No. Hei 6-53405 or in the corresponding U.S. patent application Ser. No. 08/408,561. In operation, a node that requests broadcasting of a message transmits a broadcast request message to one particular exchange switch connected to a specific crossbar switch allocated beforehand for use with the broadcast message serialization circuit; the specific crossbar switch is one of crossbar switches within the network.

The particular exchange switch is connected to two crossbar switches: the above-mentioned specific crossbar switch, and a crossbar switch to which the broadcast message source node is connected and which has coordinate axes different from those of that specific crossbar switch (e.g., an X direction crossbar switch if the specific crossbar switch is an X direction crossbar switch). When exchange switches connected to the specific crossbar switch transmit broadcast request messages thereto, the crossbar switch selects one of the transmitted broadcast request messages, changes the selected broadcast request message into a broadcast message, and sends the broadcast message to the exchange switches connected to the crossbar switch in question. The broadcast message is broadcast via these exchange switches to nodes coupled to the network.

The first variation of the first embodiment utilizes the specific crossbar switch in the same fashion as the broadcast message exchange circuit 12 of the first embodiment. The first variation is constituted by removing the broadcast message exchange circuit 12 from the setup of FIG. 1A. Concomitantly, the extended X direction crossbar switch 1XE and the extended Y direction crossbar switch 1YE are composed respectively of as many I/O ports as the number of other X direction crossbar switches and as the number of other Y direction crossbar switches. Each node is arranged to send a broadcast request message including a lock request to one of the exchange switches (i.e., the above-described specific exchange switch) connected to the specific crossbar switch. Thereafter, a broadcast message derived from that broadcast request message is broadcast to all nodes in the manner described in the above-cited Japanese Patent Application No. Hei 6-169995 or in the corresponding U.S. patent application Ser. No. 08/408,561. Each node is made up of the same circuits as those shown in connection with the first embodiment, and these circuits operate in the same manner as in the first embodiment.

Second Variation of the First Embodiment

With the first embodiment, the broadcast message exchange circuit 12 selects one of broadcast request messages each containing a lock request transmitted thereto, changes the selected broadcast request message into a broadcast message, and transmits the broadcast message to all of the nodes over the network 1. That is, the broadcast message exchange circuit 12 acts as a serialization circuit that serially selects the broadcast request messages including their lock requests. It should be noted that the broadcast message exchange circuit 12 broadcasts not only the broadcast message derived from the first-selected broadcast request message from among those containing the lock requests to the same node; the broadcast message exchange circuit 12 also broadcasts subsequently broadcast messages derived from the succeeding broadcast request messages including the lock requests to the same node. Each node receives serially the broadcast messages including the lock requests to the same node. Of these broadcast messages, the one received first is given lock grant as the only successful lock request. This means that, with the first embodiment, the subsequent broadcast messages including the lock requests to the same node other than the first broadcast message are also broadcast despite the fact that the ensuing messages are not used by any node. The network 1 continues to be used for such useless messages. The second variation of the first embodiment intends to remove this deficiency.

In eliminating broadcasting of those useless messages, the second variation has the broadcast message exchange circuit 12 equipped with the same lock state register group 52 and lock control circuit 500 as those provided in each node. When the priority circuit in the broadcast message exchange circuit 12 first selects a broadcast request message including a lock request to one node, the lock control circuit 500 in the circuit 12 sets the node designated by the lock request to the corresponding lock state register so as to indicate that the node to be locked is already locked. As with the first embodiment, the control bit change circuit in the broadcast message exchange circuit 12 changes the first-selected broadcast request message into a broadcast message which is transmitted to the network. Upon receipt of each of the subsequent broadcast request messages together with their lock requests, the priority circuit in the broadcast message exchange circuit 12 causes the lock control circuit 500 within the circuit 12 to check the content of the lock state register corresponding to the target node requested by the broadcast request message in question. If the register contains a node number of any lock request source node, that broadcast request message including the lock request is regarded as an invalid message and will not be broadcast. Under this scheme, only the first-selected of the broadcast request messages containing the lock requests regarding the same node is changed into a broadcast message which is then broadcast over the network. The lock control circuit 500 of each node may have the same constitution as in the first embodiment.

Third Variation of the First Embodiment

As a third variation of the first embodiment, the same circuits as those provided in the broadcast message exchange circuit 12 of the second variation may be included in the broadcast message serialization circuit inside the specific crossbar switch discussed in connection with the first variation of the first embodiment. Constituted in this manner, the third variation of the first embodiment implements the same function as that of the second variation.

Fourth Variation of the First Embodiment

The first embodiment also uses the broadcast message exchange circuit for serializing ordinary broadcast request messages not containing lock requests. In such cases, the network 1 is used to transmit the ordinary broadcast request messages as well as the ordinary broadcast messages generated by the broadcast message exchange circuit based on these ordinary broadcast request messages. Furthermore, the broadcast message exchange circuit is used to serialize broadcast request messages each including a lock request; the network 1 is then used to transmit these broadcast request messages and the broadcast messages derived therefrom. Alternatively, a fourth variation of the first embodiment utilizes another network comprising another broadcast message exchange circuit specifically for the purpose of handling broadcast request messages containing lock requests as well as the broadcast messages derived therefrom and having the lock requests. This network arrangement is effective in boosting the speed of message communication.

Second Embodiment

The first embodiment has been shown allowing each node to arbitrate lock requests to a given resource irrespective of which node the resource belongs to. The result of the arbitration is retained in the lock state register group in each node and utilized by these nodes. The lock request source node sends a broadcast request message containing a lock request to the broadcast message exchange circuit. In turn, the broadcast message exchange circuit changes the received broadcast request message into a broadcast message that is broadcast to all nodes. In this setup, all broadcast request messages together with their lock requests are transmitted to the broadcast message exchange circuit. With a large number of broadcast request messages thus transmitted to the broadcast message exchange circuit, there is a possibility that the circuit will develop delays in processing the received messages containing the lock requests. The lock state register group of each node is arranged so that one register corresponds to one locking unit (e.g., one node). When the resource of a given node is locked, each corresponding lock state register retains the node number of that node which has succeeded in locking the resource. This means that more registers are needed the greater the number of nodes configured. The second embodiment of the invention is designed to remove that disadvantage.

(1) Outline of the System

FIG. 4A is a schematic block diagram of another parallel computer system according to the present embodiment. The description that follows will center on how the second embodiment differs from the first embodiment. With the present embodiment, when access nodes request access to the resource belonging to one resource managing node, the access requesting nodes transmit lock requests to the resource managing node on a point-to-point communication basis. In response, the resource managing node arbitrates the received lock requests, decides to give lock grant to one of the requests, and reports the result of the arbitration to each node using a broadcast message. This scheme avoids concentration of messages together with their lock requests in the broadcast message exchange circuit, a bottleneck characteristic of the first embodiment. As with the first embodiment, the network 1 of the second embodiment comprises a broadcast message exchange circuit 12 to which the broadcast request message having the arbitration result is transmitted. The broadcast message exchange circuit 12 then broadcasts the arbitration result to all nodes on the network. In this manner, the broadcast message exchange circuit 12 is not used to serialize broadcast request messages including lock requests; the circuit 12 is used to serialize broadcast request messages containing information other than lock requests such as the result of the arbitration.

Figure 4B:
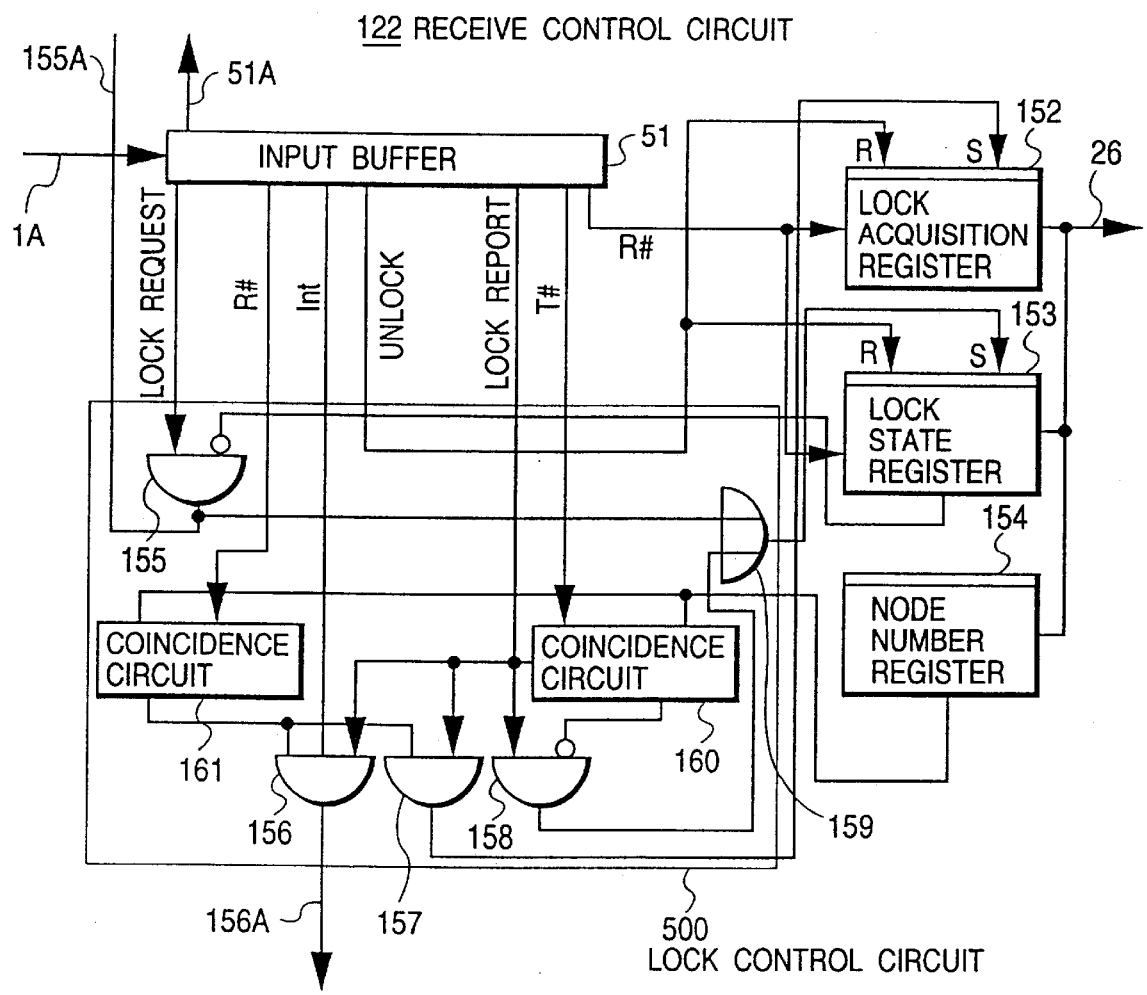
FIG. 4B is a schematic block diagram of a receive control circuit for use in the embodiment of FIG. 4A.

As depicted in FIG. 4B, the lock control circuit 500 of each node has one lock state register 153 corresponding to all nodes. Bit locations in the register are arranged so that one bit location corresponds to one unit of lock (i.e., a system node in this case). Each bit location retains the lock state value of 1 or 0 reflecting whether or not the corresponding node is currently locked. This arrangement prevents an ungainly increase in the number of registers associated with the first embodiment. Each node is further equipped with a lock acquisition register 152 for allowing its own node to identify the currently locked resource. Each of the bits in the register 152 corresponds to one unit of lock (i.e., a node in this case). When any one node with the lock acquisition register 152 has locked a resource managing node, a value of 1 is set to that bit in the register 152 which corresponds to the locked resource managing node. The lock control circuit 500, unlike that of the first embodiment, does not arbitrate lock requests; the circuit 500 instead updates the registers in accordance with the result of the arbitration coming from any one resource managing node. The access requesting node checks the updated register values to see if the lock request it issued has been granted permission to lock the target resource.

Figure 4C:
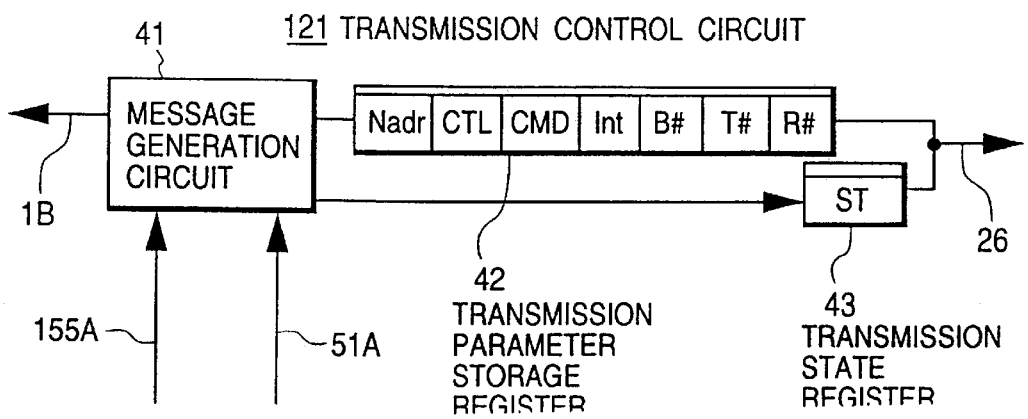
FIG. 4C is a schematic block diagram of a transmission control circuit for use in the embodiment of FIG. 4A.

A transmission control circuit 121 of each node is constituted as illustrated in FIG. 4C. The constitution and operation of the transmission control circuit 121 will be described later.

What follows is a more detailed description of how the system of FIG. 4A works.

(2) Initialization of the Registers

In every node, the processor 24 initially resets the lock state register 152 and lock acquisition register 153 to zero. A node number register 154 of each node has the number of that node set therein.

(3) Processing of Lock Requests

Figure 5A:
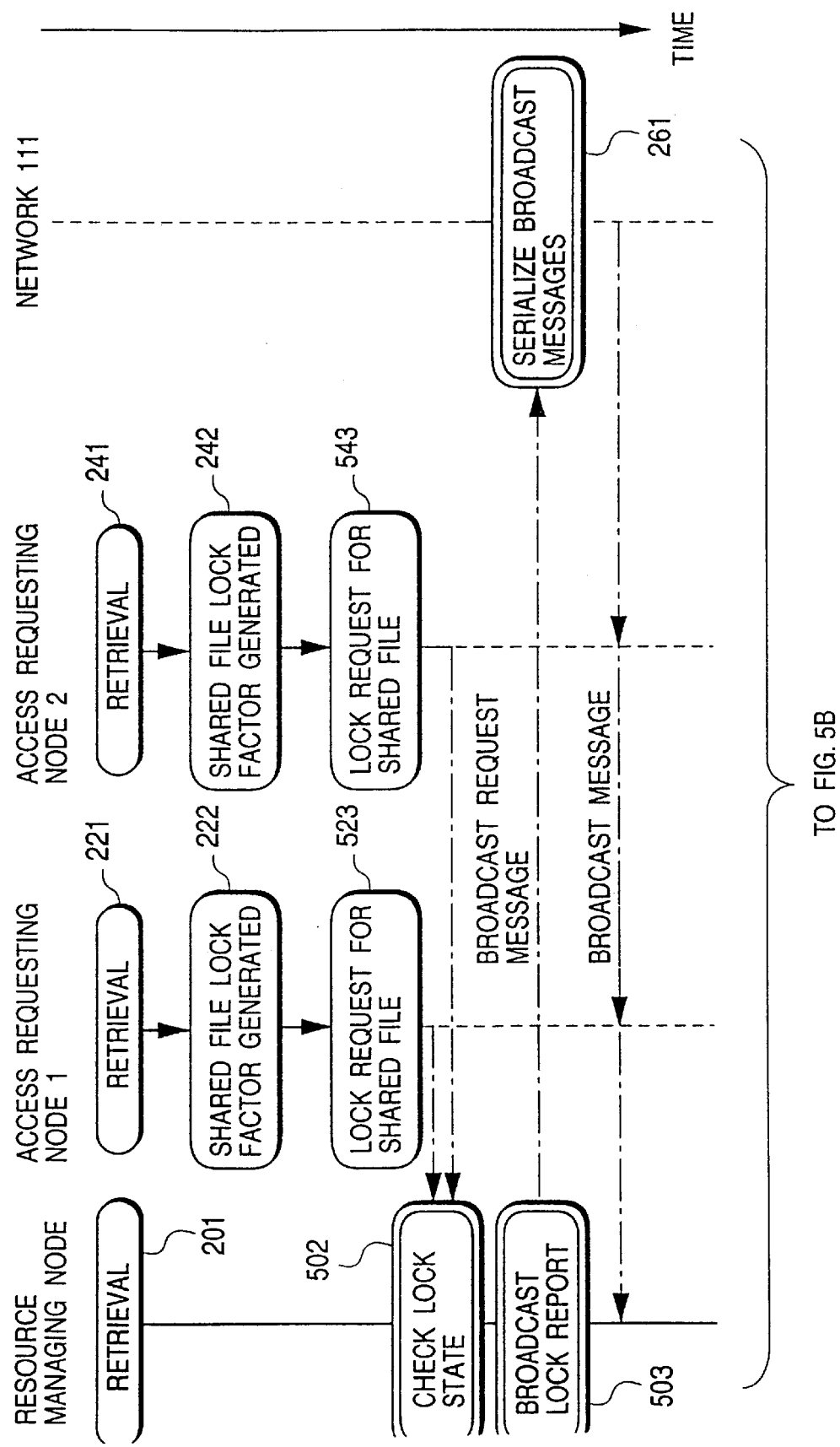
FIG. 5A is a partial flowchart of processing of an access to a shared file in the embodiment of FIG. 4A.

How lock requests are processed will now be described with reference to the flowcharts of FIGS. 5A and 5B.

(3a) Broadcasting of Lock Request Message

Each access requesting node checks to see whether or not the resource managing node to which the target resource belongs is currently locked. The check is made by referencing the value of that bit in the lock state register 152 which corresponds to the resource managing node. If the resource managing node is found to be unlocked, each access requesting node transmits a message containing a lock request to the target node (step 523 and 543). For this transmission, the following parameters are placed into the transmission parameter storage register 42:

Nadr (network address):=node number of resource managing node

CTL (control):=point-to-point communication message enable

C message D (command):=lock request

Int (interrupt):=disable

B# (bit number):=number of resource managing node

T# (target node number):=number of resource managing node

R# (access requesting node number):=own node number

"CTL" is a bit that indicates the message type. In this example, the CTL bit shows that the message is a point-to-point communication message. "C message D" is a code that indicates the command type which is a lock request in this example. In addition to the lock request, the second embodiment uses such commands as a lock notification command and an unlock command. "B#" is information which identifies the resource to be locked. Here, the number of the resource managing node in question is utilized. "T#" is the number of the resource managing node to which the resource to be locked belongs. "R#" is the number of the access requesting node. The parameters Nadr, CTL and Int are the same as those of the first embodiment. The message generation circuit 41 transmits the message including the above-described parameters via the line 1B and network 1 to the resource managing node designated by the address "Nadr."

(3b-1) Arbitration of Lock Requests (lock success case)

When a plurality of access requesting nodes send a plurality of messages each containing a lock request to the same resource managing node, these messages are transmitted over the network 1 to the resource managing node in question. The resource managing node receives these messages serially from the network 1 via the line 1A into the input buffer 51. When the first of the messages enters the input buffer 51, the bit number "B#" in the message command is fed to the lock state register 153 and lock acquisition register 152. A decoder (not shown) in the input buffer 51 interprets the command bit "C message D." If the command is found to be a lock request, an AND gate 155 is supplied with a signal indicating that the command when interpreted turned out to be a lock request. The other inverted input of the AND gate 155 is fed with the bit value representing the bit number "B#" from inside the lock state register 153. If the bit value is 0 (i.e., where the resource managing node has yet to be locked), the output 155A of the AND gate 155 is 1. The output signal 155A, indicating that the lock request has been granted permission to lock the target resource, is sent to the set terminal of the lock state register 153 via an OR gate 159. As a result, the current bit value representing the bit number "B#" in the lock state register 153 is replaced by the value 1 indicating that the resource managing node is now locked. The output 155A of the AND gate 155 further instructs the message generation circuit 41 to output a broadcast request message containing a lock report in the form of a command. In this manner, the AND gate 155 allows the current lock state to be checked (step 502).

The message generation circuit 41 receives via a line 51A the message from the input buffer 51, and generates the corresponding broadcast request message in response to the instruction signal from the AND gate 155 and according to the message from the input buffer 51. The generated message is composed of new parameters shown below as well as other parameters held in the input buffer 51, and is supplied onto the network 1. The following new parameters are retained in advance in the message generation circuit 41:

Nadr: address of broadcast message exchange circuit 12

CTL: broadcast request message

C message D: lock report

The broadcast message exchange circuit 12 changes the message above into a broadcast message by changing the control bit CTL therein. The broadcast message is then broadcast to all nodes (step 503).

(3b-2) Arbitration of Lock Requests (lock failure case)

After the first of a plurality of messages each containing a lock request has been processed as described above, the subsequent messages are admitted serially into the input buffer 51. However, no lock requests included in these messages are granted permission to lock the target resource. This is because the AND gate 155 keeps outputting 0 as it already admits the bit value 1 from the lock state register 153.

(3c) Lock Acknowledgment

When the message having the lock report and broadcast from the broadcast message exchange circuit 12 is transmitted to any one node having issued the lock request, the target node number "T#" in the message is sent to a coincidence judgment circuit 162 for comparison with the node number in the node number register 154 of the own node. If the comparison shows that the node in question is other than the resource managing node, no coincidence is detected. An AND gate 158 receives the inverted output of the coincidence judgment circuit 162 and a signal indicating that the command "C message D" in the message turns out to be a lock report when interpreted. Because each of the inputs is 1 for any other node than the resource managing node, the AND gate 158 outputs 1. The output of the AND gate 158 is input to the set terminal of the lock state register 153 via an OR gate 159. In the register 153, the value 1 is set to the bit location indicated by the bit number "B#" in the above message. Thus the lock state register 153 in each of the nodes involved shows that the resource managing node is currently locked (steps 524 and 544). As described earlier, the resource managing node writes 1 to the same bit location as in the lock state register 153 when it grants any one lock request permission to lock its resource.

Where any one access requesting node has received the message containing the lock report, that node sends the access requesting node number "R#" within the message to a coincidence judgment circuit 161 for comparison with the node number in the node number register 154. Of a plurality of access requesting nodes having sent their lock requests to the resource managing node, the one node that was granted permission to lock the resource detects coincidence as a result of the comparison. An AND gate 157 receives the output of the coincidence judgment circuit 161 and a signal indicating that the message is interpreted to have the lock report. Thus, in the access requesting node having succeeded in locking the target resource, the AND gate 157 outputs 1 that is input to the set terminal of the lock acquisition register 152. In the register 152, the value 1 is set to the bit location designated by the bit number "B#" of the above message (step 524). In those access requesting nodes which were not granted permission to lock the resource, the content of the lock acquisition register 152 remains unchanged.

As described, each of a plurality of access requesting nodes gets the processor 24 to check the contents of the registers 152 and 153 to see if the target resource managing node is currently locked and, when the target node is found to be locked, to see if this access requesting node has succeeded in locking the target resource (steps 525 and 545).

An AND gate 156 supplies an interrupt signal 156A to the processor 24 of the access requesting node having succeeded in locking the resource, provided that a coincidence is detected in the coincidence judgment circuit 161 and that the interrupt signal "Int" in the received message is 1.

(3d) File Access

The access requesting node that has succeeded in locking the target resource issues an access request to the corresponding resource managing node. In response, the resource managing node gains access to the disk apparatus located therein (steps 225 and 202). The process involved is the same as that of the first embodiment.

(3e) Shared File Unlock Request

When the access by the access requesting node to the target resource has ended, the node transmits a broadcast request message including an unlock request to the broadcast message exchange circuit 12. This message comprises the parameters shown below. Upon receipt of the broadcast request message, the broadcast message exchange circuit 12 broadcasts to all nodes a message containing the following parameters (step 527):

Nadr:=address of broadcast message exchange circuit 12
CTL:=broadcast request message enable
C message D:=unlock
Int:=disable
B#:=number of resource managing node in question
T#:=number of resource managing node in question
R#:=own node number After each node has received the above message, the reset terminal of the lock state register 152 and that of the lock acquisition register 153 are fed with a signal from the input buffer 51 indicating that the message is interpreted to contain the unlock request. In the registers 152 and 153, the bit value designated by the bit number "B#" within the message is reset to zero. In the plurality of nodes other than the access requesting node having succeeded in locking the target resource, the value of the lock acquisition register 152 has already been zero and remains so during the unlocking process. Thus in each node, the registers 152 and 153 show that the resource managing node is currently unlocked (steps 504, 528 and 547).

As described, the second embodiment not only provides the same benefits as the first embodiment but also allows any one resource managing node, unlike the first embodiment, to arbitrate a plurality of lock requests regarding the resource. Unlike the first embodiment, the second embodiment has no need to send broadcast request messages comprising lock requests to the broadcast message exchange circuit and thereby alleviates congestion resulting from the numerous broadcast request messages flowing into that circuit. In addition, the second embodiment makes it possible for one lock state register and one lock acquisition register in each node to show both the lock state of available resources and the node that has succeeded in locking the target resource. The register arrangement of the second embodiment thus comprises far fewer registers than those required by the first embodiment.

Variation of the Second Embodiment

With the second embodiment, a single shared file is assumed to reside in each node. If each node has a plurality of shared files, a variation of the second embodiment may furnish each node with a plurality of lock state registers and a plurality of lock acquisition registers to correspond with the different shared files. Constituted in this manner, the variation allows each of the shared files to be managed independently of the other files in terms of the lock state.

The prior art related to event communication and some problems associated therewith are described below in detail. Thereafter, embodiments of a computer system according to the present invention related to event communication will be described.

There exist various types of parallel computer system. Typical ones are a distributed main storage type parallel computer system in which each PE has a main storage, and a shared main storage type parallel computer system in which PE's share a main storage. The latter system is divided into two types: one has the main storage physically concentrated at a single location; the other is what is called a distributed shared memory type parallel computer system wherein each of a large number of PE's includes part of main storage logically shared by the PE's. The latter system has recently attracted attention for extendibility of a total PE number and for easiness of programming.

In the shared main storage type parallel computer system, a typical conventional method for communicating events between different PE's (called the first event-related conventional technique hereunder) is by means of the shared main storage. According to this method, flag areas are provided for each PE in a shared main storage. The flag areas for each PE hold flags sent from other PE's to the PE. A source PE informs a destination PE of an event by writing a flag into an event communication area allocated to the latter PE. The destination PE periodically polls the flag areas allocated thereto in the main storage, so as to check if any of the flag areas has a flag written therein. If any flag is detected, the destination PE informs an appropriate program being executed in the destination PE of the detected flag, so that the program will process the event indicated by the flag. It may happen that each PE detects an event only if the PE has been informed of plural flags from plural other PE's. Under such a scheme, each PE checks to see if plural flags are written in the main storage.

According to the method where each PE detects a flag or flags written in the shared main storage by polling, specialized hardware is not necessary for event communication. However, the fact that each PE accesses the main storage periodically for flag detection results in large overhead to flag detection processing. In particular, it takes time for each PE to detect flags in the shared main storage, if each PE is composed of a recently marketed microprocessor, because each PE requires dozens of machine cycles to access the shared main storage. In addition, the flag detection time will increase more according to the above method which detects flags by polling the shared main storage, if plural flags are to be detected.

Another conventional method for event communication (called the second event-related conventional technique hereunder) is to have an event-informing source PE writing a flag into an area in the shared main storage allocated to an event-informing destination PE, as mentioned above, and to inform the destination PE of occurrence of an event by interruption. The interrupted PE polls flag areas allocated thereto, so as to check which of the flag areas has been written into. The second conventional technique is quicker than the first in detection timing of event occurrence. However, overhead of event detection is still large according to the second technique, because interruption handling processing is heavy, and it is necessary to poll plural flag areas every time an interruption occurs.

A conventional technique for executing barrier synchronization (called the third event-related conventional technique hereunder) adopts the following steps: when program execution reaches a predetermined stage in each PE, the subsequent program execution in that PE is halted. When all PE's have reached the predetermined program execution stage, all PE's are informed thereof and are then allowed to proceed to their subsequent program execution stage. When program execution in each PE has reached the predetermined program execution stage, that PE informs another PE (such as a parent PE) thereof by issuing an event thereto to realize the above mentioned operation. The parent PE checks to see if any event has been communicated from other PE and judges whether all PE's have reached the predetermined execution stage. The parent PE checks for that judgment if a predetermined number of flags have been written. When the parent PE ascertains that all PE's have reached the predetermined program execution stage, the parent PE instructs all PE's to resume their program execution. In this case, as an event communication method plural PE's write flags into the shared main storage, as in the first event-related conventional technique, and then the parent PE polls flags in the main storage and detects completion of writing of the flags.

There is another method (the method is called the fourth event-related conventional technique hereunder) in which the same flag in a single flag area allocated to a common transmission destination such as the parent PE, in place of the above method for checking whether a predetermined number of flags have been written. According to the fourth technique, the parent PE detects occurrence of an event by checking whether the flag has reached a specific value which the flag should have when the plural PE's have updated the flag.

A variation of the above technique is that every time a PE updates the flag value, that PE interrupts the parent PE and the parent PE check the flag value by software. This variation, however, also involves large flag detection overhead as with the previously described method in which PE's write flags and the parent PE detects them.

Another conventional technique for event communication in a parallel computer system (called the fifth event-related conventional technique hereunder) is disclosed by Nakagawa et al., in "Slit-Check Features to the Speed Up Interprocessor Software Interruption Handling" (Study Report of the Information Processing Society of Japan, Vol. 89, No. 60, pp.17–24, July 1989). According to the fifth technique, each PE is furnished with a group of event communication registers (called slit check registers). A source PE writes a flag to one of the group of event communication registers within a destination PE, and interrupts that destination PE. Each PE has an OR gate that OR's the contents of the group of event communication register in that PE, and a register (called a slit check flag register) for retaining the output of the OR gate. By polling the contents of the slit check flag register, each PE finds out whether any event notification has come from any other PE. Specifically, if the slit check flag register is found to contain 1, that means a flag has been written from another PE, so that PE detects whether a flag has been written to the group of event communication flags.

According to the fifth conventional technique, the destination PE responds to an interruption by a source PE and serially polls slit check registers to find a register into which a flag has been written. With event communication registers installed in each PE, the technique eliminates the need for polling flags in the main storage and thus allows each PE to detect event occurrence with low overhead. One disadvantage of this technique is that because event flags are written into specialized registers dedicated to event communication, a total number of event flags is limited by amount of the register hardware. This severely restricts the degree of freedom in programming, because the software designer has to be aware of a total number of available event flags and to determine event flags used in a program.

The various conventional techniques outlined before which communicate events by way of the shared main storage substantially eliminate the constraint on the total number of available event flags. These techniques are preferable to the preceding technique using event communication registers, in the sense that the degree of freedom of software is not restricted.

According to the first event-related conventional technique, each PE periodically polls flag areas in the main storage under software control and detects whether any flag is written in these areas. So, it occurs that the main storage is accessed despite the fact that no flag has been written therein. This results in useless access to the main storage and increase in flag detection overhead.

Each PE requires to poll all of the flag areas in the main storage, even when a flag is written in the main storage, because the PE does not know which flag area has the flag written therein. The same applies to the second event-related conventional technique where each interruption triggers polling of the flag areas in the main storage. Where a total number of flag area is large, the repeated access to the main storage results in large overhead to flag detection.

According to the fourth event-related technique, plural PE's access a flag area in the main storage allocated to a common PE, update the flag held in the flag area, and the common PE checks under software control to see if the updated flag has reached a predetermined value. This technique also involves large overhead in repeated reading of the flag value from the main storage.

A parallel computer system according to the present invention related to event communication will now be described in detail with reference to embodiments shown in the accompanying drawings.

Third Embodiment (1) Outline of the System

FIG. 6A is a schematic block diagram of a parallel computer system according to the present embodiment. In FIG. 6A, reference numerals 100 and 200 denote a processor element (PE) (PE0 and PE255). The present embodiment presumes 256 PE's, only two of which are depicted here for simplification. Reference numeral 900 represents a network for data communication between PE's. FIG. 6A shows a detailed internal structure of PE100 alone. The other PE's have exactly the same structure. Each PE has a CPU 110 and a local main storage 111. In each PE, CPU 110 accesses the local main storage 111 via a bus 120. The local main storage 111 of each PE is shared by all PE's, thereby constituting a multiprocessor system having a distributed shared memory arrangement. Each PE can access the local main storage 111 of any other PE via the network 900 for a data read or write operation. Such access realizes transmission of data between different PE's. An external access circuit 130 transmits a command for access to a main memory to a command packet assembly circuit 150, when CPU of a given PE issues the command and the memory address designated by that command is found to be allocated to the local main storage 111 held by other PE. The command packet assembly circuit 150 assembles a packet containing the command and transmits the packet to the other PE over the network 900. A command packet decomposition circuit 160 of the destination PE extracts the command from the packet upon receipt of the packet from the source PE, and accesses to the local main storage 111 in accordance with the command.

Figure 6B:
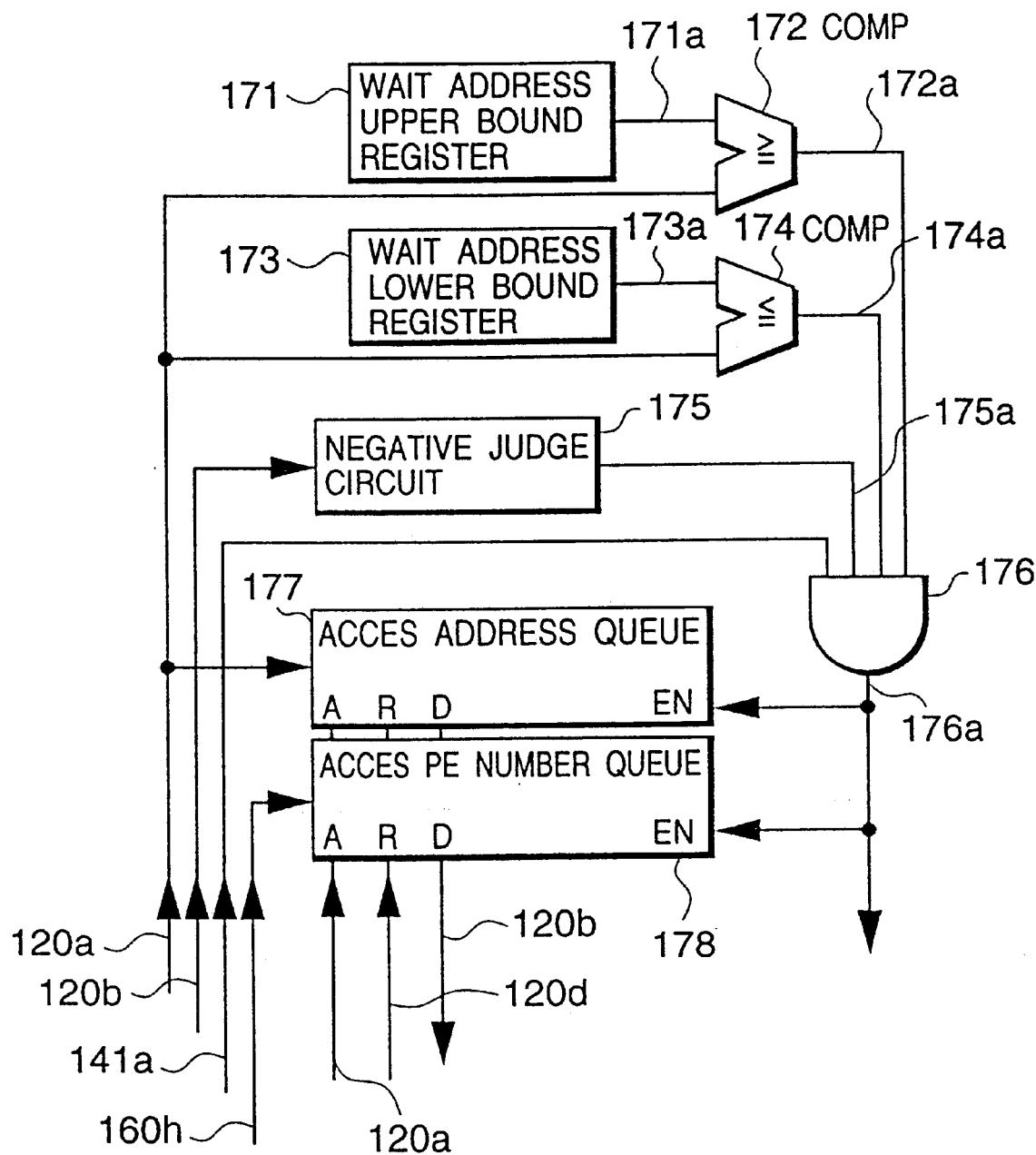
FIG. 6B is a schematic block diagram of an event wait circuit for use in the embodiment of FIG. 6A.

In FIG. 6A, reference numeral 170 denotes an event wait circuit which, specific to the present embodiment, detects occurrence of an event by monitoring a write operation made by other PE to an event flag area in the local main memory of the PE in question. A detailed structure of the event wait circuit 170 is shown in FIG. 6B. Reference numeral 112 is a polling latch for indicating whether the event wait circuit 170 has detected event occurrence; 113 is an interrupt enable latch for controlling generation of an interruption at occurrence of an event; and 114 is an interrupt control gate, a circuit element furnished anew in the present embodiment, when another PE transmits the command to the PE over the network 900 requesting a data write operation to the local main storage 111 of the PE, the event wait circuit 170 of the PE judges whether the write address designated by the command corresponds to a flag write area in the local main storage 110. If the command is found to designate a write operation to a flag area in the local main memory 110, the event wait circuit 170 sets the polling latch 112, thereby informing CPU 110 of occurrence of an event. If the interrupt enable latch 113 has a value of 1, the gate 114 generates an interruption to CPU, and informs CPU of occurrence of an event by the interruption. In this manner, the present embodiment allows each PE to carry out detection of flag writes at high speed using a hardware arrangement for detecting flag writes from other PE's. The wait event circuit 170 retains the write address and source PE number, if a flag write is detected. Thereby, CPU 110 can read the flag selectively from the write address location retained by the event wait circuit 170, when reading the written flag from the local main storage 111 after detection of an event. This arrangement permits selective access to solely the flag area where the flag is actually written, thus eliminating the need for accessing all of the flag areas. In addition, the written flag is processed by utilizing the source PE number held in the event wait circuit 170. More details of the present embodiment will now be discussed below.

(2) Detection of Simple Event

A program currently under execution in each PE inform other program under execution in other PE of an event, when the program has reached a predetermined execution stage, or finds it necessary to request the other PE to perform work. The program of the other PE confirms notification of the event and selects subsequent processing. Event notification mentioned above takes place as follows: the source PE first writes a flag indicating occurrence of an event into the local main storage of a destination PE where program execution is in progress. The destination PE detects writing of an event flag using appropriate means, and informs the program under execution of notification of an event. In the description that follows, the event recognized by detection of a single event flag may be called a simple event, as opposed to a barrier synchronization event to be described later.

The local main storage 111 of each PE is provided beforehand with flag areas for writing of such event flags.

A program of the source PE issues a main storage write command designating the main storage address to which to write the flag, in requesting the writing of an event flag.

Figure 9A:
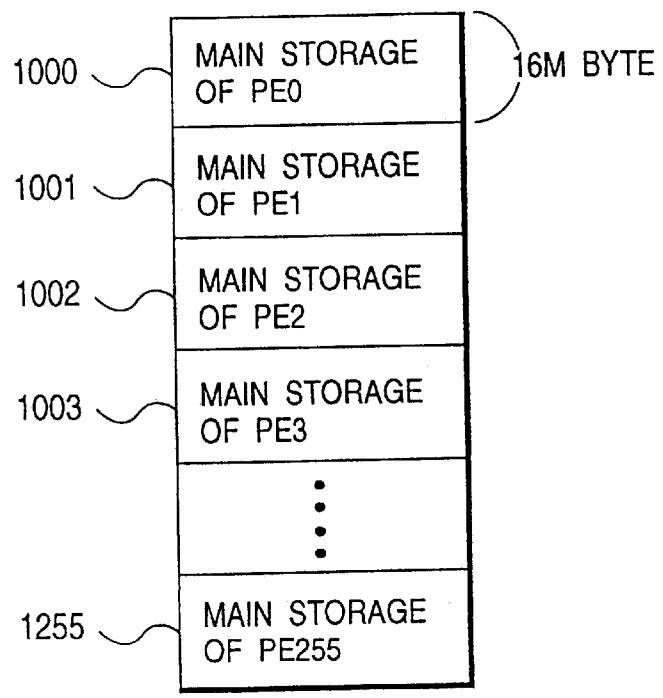
FIG. 9A shows a typical address map of a main storage for use in the embodiment of FIG. 6A.
Figure 9B:
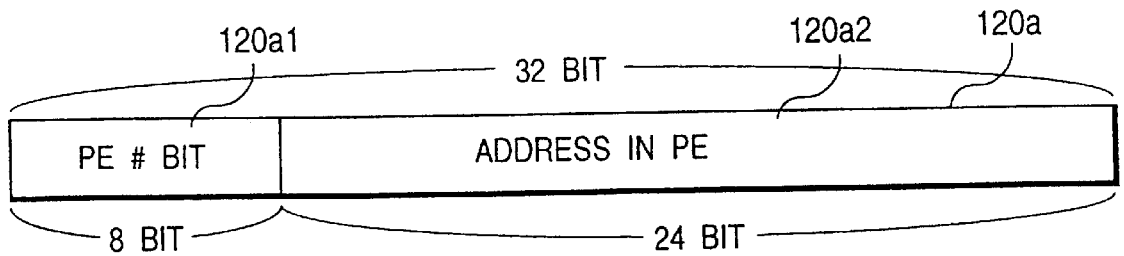
FIG. 9B indicates typical relations among an address, a PE number and an intra-PE address for use in the embodiment of FIG. 6A.

FIG. 9A shows a typical address map of the main storage for use with the present embodiment. The local main storage 111 of each PE is of 16 MB size. Sequentially different address areas are assigned to a total of 256 local main storage 111 of the PE's. A given address of this address space is represented by 32 bits as shown in FIG. 9B. A high-order eight-bit part 120*a*1 denotes a PE number, and a low-order 24-bit part 120*a*2 represents an address in the local main storage 111 of one PE. In the present embodiment, a command for accessing a main storage designates an access location within the main storage with on address of this format.

CPU outputs a main storage access address 120*a*, a write signal 120*c* and write data (i.e., event flag in this case) 120*b* onto the bus 120, when it has executed the main storage write command issued by the program of the flag informing source PE.

Figure 8:
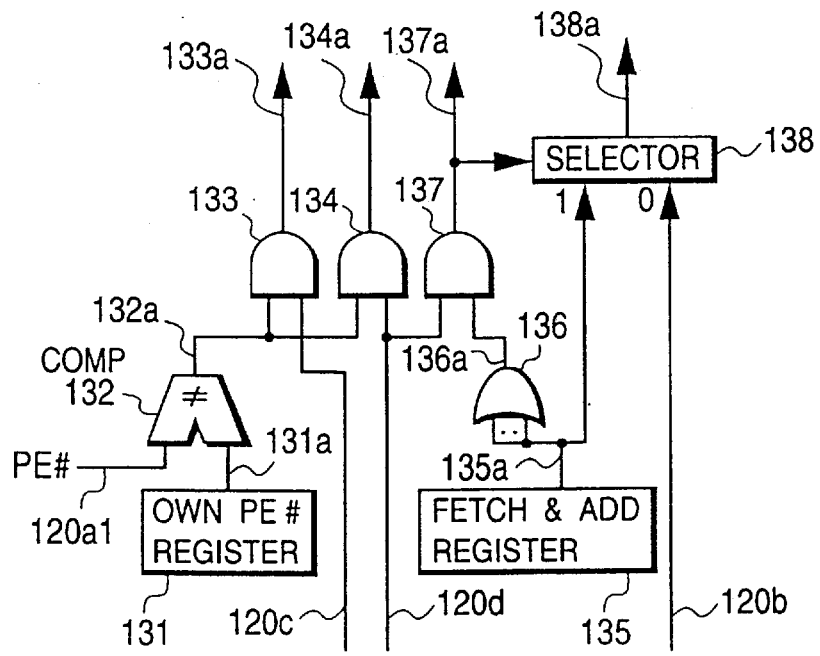
FIG. 8 is a schematic circuit diagram of an external access circuit for use in the embodiment of FIG. 6A.

The external access circuit 130 checks the main storage access address 120*a* when the write signal 120*c* is placed on the bus 120, to see if the address is allocated to the local main storage 111 of any other PE than this PE to which the CPU belongs, and requests the command packet assembly circuit 150 to assemble a packet including this command, if it is found that this address belongs to another PE. In the external access circuit 130, as depicted in FIG. 8, a comparator 132 compares its own PE number held in a register 131 with the PE number bit part 120*a*1 in the address 120*a* provided from CPU, and checks if the address belongs to the local main storage 111 of another PE. In case a mismatch is found, i.e., when the address belongs to another PE, the comparator 132 outputs 1, AND gate 133 sends the write signal 120*c* to the command packet assembly circuit 150 over a line 133*a*. An AND gate 137 outputs 1 when the CPU requests generation of a fetch-and-add command packet. The AND gate 137 outputs 0 if the command is a write command, as discussed now. A selector 138 sends the data 120*b* (event flag in the present case) to the command packet assembly circuit 150 via a line 138*a* when the AND gate 137 outputs 0.

The command packet assembly circuit 150 is also supplied with the address 120*a* over the bus 120 and is furthermore fed with the PE number bit part 120*a*1 in the received address by way of a selector 151 and a line 151a. The selector 151 always selects the PE number bit part 120a1 except when a read command is supplied from another PE, as will be explained later.

Figure 11:
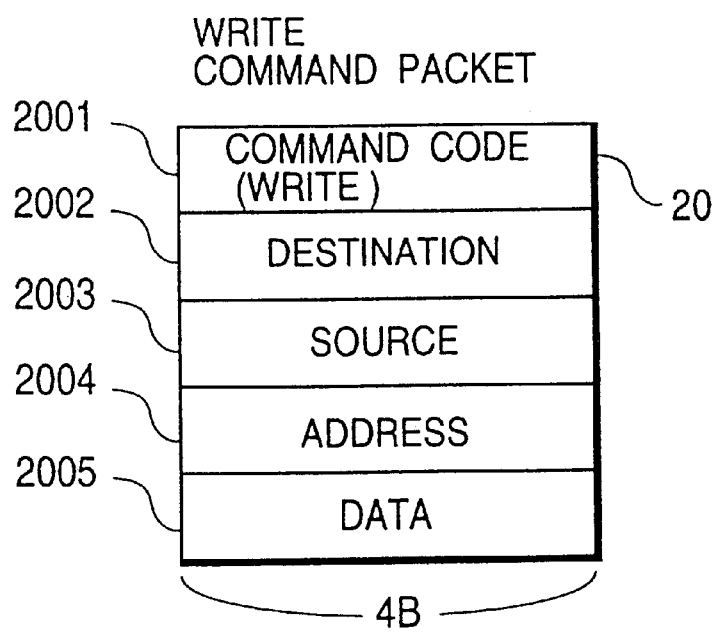
FIG. 11 depicts a typical format of a write command packet for use in the embodiment of FIG. 6A.

The command packet assembly circuit 150 assembles a write command packet 20 whose content is illustrated in FIG. 11 upon receipt of the write signal over the line 133a. A field 2001 of this packet contains a write command code corresponding to the write signal from the line 133a. A field 2002 contains, as the destination PE number, the PE number bit part 120a1 sent over the line 151a. A field 2003 includes, as the source PE number, the number of its own PE retained in a register (not shown) inside the command packet assembly circuit 150. A field 2004 holds the write address 120a fed over the bus 120. A field 2005 retains the write data (event flag in this case) supplied over the line 138a. The write command packet is sent from the command packet assembly circuit 150 over a line 150a to a transmission circuit, not shown, which forwards the received command packet onto the network 900. The network 900 is designed to transmit packets in parallel like a known network such as a crossbar network, a network composed of multistage switches, or a hyper-crossbar network connecting crossbar networks. The network 900 transmits the packet to the destination PE according to the designation PE number in the write command packet.

In the destination PE, a reception circuit, not shown, receives the write command packet 20 and the command packet decomposition circuit 160 decomposes the packet, to output the following signals: a write signal is sent over a line 160b to a main storage access circuit 140 because the command code in the command packet is a write command. The data in the command packet is fed to the main storage access circuit 140 over a line 160f. The address in the write command packet is placed onto the bus 120. The source PE number is supplied to the event wait circuit 170.

Figure 7:
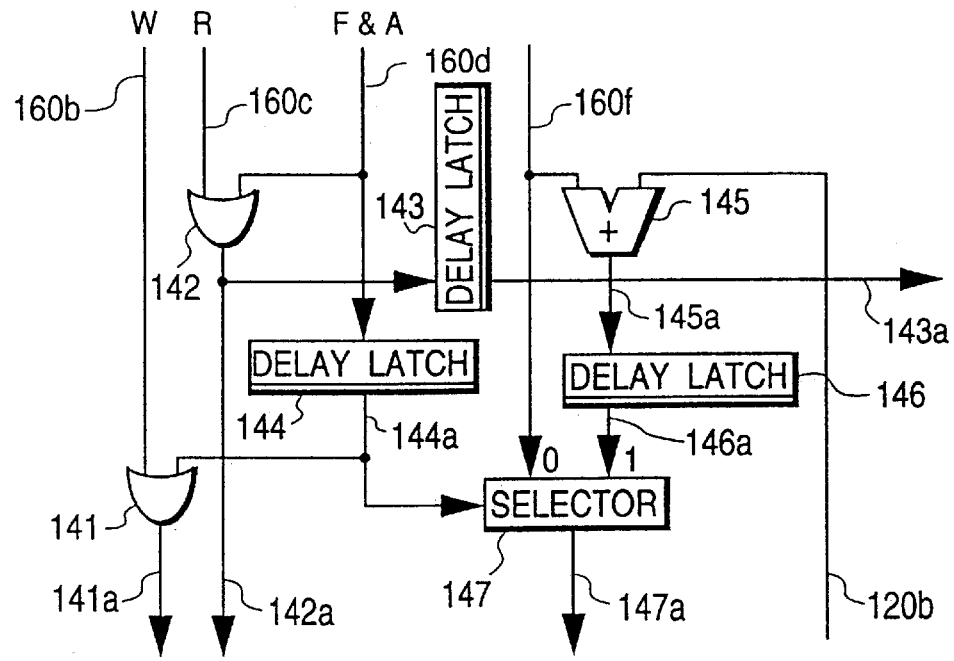
FIG. 7 is a schematic circuit diagram of a main storage access circuit for use in the embodiment of FIG. 6A.

The main storage access circuit 140 writes the received data to the local main storage 111, in accordance with the output from the command packet decomposition circuit 160. Specifically, as shown in FIG. 7, the main storage access circuit 140 sends the write signal from the line 160b onto the write signal line 120c of the bus 120 via an OR gate 141 and a line 141a. A selector 147 selects the write data from the line 160f and supplies the selected data to the data line 120b of the bus 120 via a line 147a. The selector 147 always selects the data on the line 160f under control of the signal on a line 160d, except when the command packet decomposition circuit 160 feeds a fetch-and-add command signal onto the line 160d. The local main storage 111 of this PE is furnished beforehand with contiguous flag areas for holding event flags. The local main storage 111 places the event flag in the form of the write data into the location designated by the intra-PE address 120a2 in the main storage address 120a, in response to the write signal on the bus 120. In this manner, the event flag is written from the source PE into the local main storage of the destination PE.

In the present embodiment, the event wait circuit 170 is constructed to act when data is written into the local main storage. In the event wait circuit 170, registers 171 and 173 respectively hold an upper and a lower bound address value delimiting the upper and lower bounds of the contiguous flag areas for event flags. CPU can set these upper and lower bound values to desired values by using software instructions. For simplification, FIG. 16B omits the signal lines for transmitting data to be written into the two registers. A comparator 172 compares the write address on the address line 120a with the upper bound value in the register 171, when the write signal is placed onto the write signal line 120c of the bus 120, and outputs a signal 1, if the write address is lower than the upper bound value. A comparator 174 compares the write address on the address line 120a with the lower bound value in the register 173, and outputs a signal 1, if the write address is found to be higher than the lower bound value.

In the present embodiment event flags have negative-values for reasons to be described later. A negative judgment circuit 175 checks to see if the write data placed onto the data line 120b is negative, and outputs a signal 1, if the write data is negative. An AND gate 176 is fed with the write signal 120c from the bus 120 in addition to the outputs of the comparators 172 and 174 and the negative judgment circuit 175. As a result, the AND gate 176 detects occurrence of an event and outputs a signal 1, when an event flag is written to one of the flag areas in the local main storage 111. An access address queue 177 holds the main storage address into which the event flag was written, as placed on the line 120a of the bus 120, when the output of the AND gate 176 has become 1. Likewise, an access PE number queue 178 takes in the source PE number 120a1 fed from the command packet decomposition circuit 160. These queues have entries to respectively hold the main storage addresses and the source PE numbers associated with plural events, in the order of generation of the events. The queues are constituted so that CPU can read their contents by issuing software instructions.

The AND gate 176 sets the polling latch 112 via a signal line 176a when an event occurs. The set operation is performed even if the latch 112 is already set, and the result is that the latch 112 gets set.

The CPU 110 knows occurrence of an event by repeatedly polling the latch 112 periodically via a signal line 110a.

The occurrence of an event is also reported to the AND gate 114. The interrupt enable latch 113 can be set by CPU according to software instructions. AND gate 114 supplies an interrupt signal to CPU via a line 110b, when occurrence of an event is reported via the line 176a in case the latch 113 is set.

CPU starts its interrupt handling program in response to the interrupt signal and accesses the access address queue 177 and the access source PE number queue 178 in a course of execution of the program.

(3) Event Processing Using Polling Register 112

Described below is how CPU detects an event by the polling register 112. CPU checks the output 110a of the polling latch 112 at suitable breaks in processing. CPU continues its processing, if the output 110a is 0, because that means no event has occurred. In the prior art where flag areas are simply polled periodically, all flag areas must be polled regardless of whether any flag has actually been written into any flag area. That useless polling is eliminated by the present embodiment.

If the polling register 112 contain 1, that means an event has occurred and event processing is required. In that case, CPU performs the following steps:

(a) CPU resets the polling latch 112 to 0 by means of a reset signal 110c.
(b) CPU finds the address at which the event occurred from a write operation thereto, by reading the contents of the access address queue 177 and access PE number queue 178. The access address queue 177 allows CPU to detect, the flag area into which the event flag was written among the flag areas inside the local main storage 111, without polling the main storage. Without the access address queue 177, CPU would be required to access each and every one of the flag areas to know if it has a flag written therein. With such accesses to the main storage eliminated, the present embodiment permits high-speed event processing.

Even when plural PE's have written the same event flag into the same flag area in the local main storage 111, CPU can detect that plural flags have been written because the access PE number queue 178 retains the PE numbers of these PE's.

(c) CPU processes the event. For use in the event processing, CPU can read additional information from that address in the main storage which is designated by the access address queue 177. CPU can also find which PE has reported the event by reading the content of the access PE number queue 178. The access PE number queue 178 allows CPU to distinguish these PE even if plural PE's have written the same event flag at the same time. The information on the PE that wrote the event flag is important where a request for load distribution between PE's is made by use of an event. Without the access PE number queue 178, it would be necessary to inform CPU of each source PE number, for example, by allocating event areas for the respective PE's. This is not required of the present embodiment. Instead, the event wait circuit 170 detects the PE number of each source PE by using the source PE number included in the received write command and places it in the queue 178.

(d) CPU repeats the above steps (b) and (c) as long as the access address queue 177 and access PE number queue 178 have entries to be read out.

What is important here is that the step (a) for resetting the polling latch 112 to 0 must be performed before the event processing. If the polling latch 112 is reset to 0 after the event processing, there is a possibility of losing track of an event arriving between the end of the event processing and the resetting of the polling latch 112 to 0. According to the present embodiment, it may be found that the polling latch 112 has 1 even though the event processing has ended if a new event arrives after the resetting of the polling latch 112 to 0 and before the end of the event processing. In that case, however, there is no possibility of malfunction because the next polling will reveal at execution of the step (b) above that the access address queue 177 holds nothing.

(4) Event Processing Using Interruption

The interrupt enable latch 113 needs to be set in advance, if it is desired for CPU to perform event processing by use of interruptions.

Where an interruption generated by the AND gate 114 is used to deal with an event, CPU is required to perform an extra process of executing the interrupt handling program, but it is advantageous that CPU knows occurrence of an event the moment the occurrence is detected by the AND gate 176.

Even in the interruption-triggered event processing mentioned above CPU quickly knows which event has occurred, by accessing the main storage address queue 177 to find the flag area into which the event flag was written, as in the event detection using the polling register 112 mentioned before. Similarly, accessing the access PE number queue 178 enables CPU to know the event source PE, as in the event detection using the polling register 112.

(5) Detection of Barrier Synchronization Event

In addition to the above cases where it is judged that an event has occurred when one event flag has been written, the present embodiment can also be applied to cases where it is judged to that an event have occurred when plural event flags have been written into the same flag area. This scheme of event occurrence detection is used with the barrier synchronization feature mentioned earlier and so on. A fetch-and-add command is used to generate such a barrier synchronization event.

For example, consider adopting the barrier synchronization in a system comprising as many as N PE's. It is assumed that a flag area for accommodating a barrier synchronization flag provided in the local main storage 111 of the parent PE has an address V. The parent PE initializes beforehand the data at address V in the local main storage of the PE to N-1. Thereafter, when the program under execution in each PE has reached a predetermined barrier, that PE issues a fetch-and-add command requesting addition of −1 to the data at address V in the local main storage 111 of the parent PE (i.e., 1 is to be subtracted from the data at address V). A packet including this command is transmitted from that PE to the parent PE. The main storage access circuit 140 of the parent PE responds to this command and reads the data from address V, adds −1 to the read-out data, and writes the result back to the same address V. When the program execution status of every PE has reached the barrier, negative data (e.g., −1) is written to address V in the local main storage 111 of the parent PE. At this point, the negative judgment circuit 175 inside the event wait circuit 170 of the parent PE finds out that the negative data has been written, thereby detecting occurrence of an event. Thus, use of the fetch-and-add command and the negative judgment circuit for detecting a negative value in a specific location of the local main storage where event flags are retained enables detection of an event which occurs when a variety of conditions have been met, e.g., when plural flags have been written. The operations above will be described below in more detail.

Barrier synchronization is used either for all of the PE's, or for some of these PE's and the present embodiment is applicable to both cases. For simplification, it is assumed here that barrier synchronization is applied to all of the PE's. The parent PE selects one of flag areas provided beforehand in its local main storage 111 as a barrier synchronization flag area, and places the value N-1 in that flag area, i.e., the number of PE's other than the parent PE among all PE's subject to barrier synchronization.

As described, when a program under execution in each PE has reached a predetermined stage called a barrier, that program issues to the external access circuit 130 a command for setting a nonzero addend into the flag. CPU of the PE writes the command-designated addend into a fetch-and-add register 135 (FIG. 8) inside the external access circuit 130. For simplification, FIG. 8 omits a line for transmitting the addend to the register 135 as well as a circuit for writing the addend into the register 135.

In the PE whose has reached the predetermined barrier, CPU issues a read command designating the address of the barrier flag area in the parent PE. Generally, the read command requires that data be read from the command-designated address location in the main memory and be transmitted to the source PE which issued the command. In the present embodiment, however, the external access circuit 130 transforms the read command into a fetch-and-add command when a nonzero value is already set in the fetch-and-add register 135 inside the external access circuit 130. The latter command requires that data be read from the command-designated address location and be transmitted to the source PE; that the command-designated addend be added to the read-out data; and that the data resulting from the addition be written into the address location where the initial data was held.

More specifically, each PE issues a read command designating the address holding the barrier synchronization flag in the local main storage when the PE has reached the barrier. In the external access circuit 130 of the PE, an OR gate 136 receives via a line 135a the bits of the addend from the fetch-and-add register 135. Since the addend is not zero in this case, the OR gate 136 outputs 1 which is sent to the AND gate 137 via a line 136a. Thus, in the external access circuit 130, the AND gate 137 outputs 1 when a read signal 120d is supplied from the bus 120. The output of the AND gate 137 is sent as a fetch-and-add signal to the command packet assembly circuit 150 via a line 137a. The selector 138 sends the addend from inside the register 135 to the command packet assembly circuit 150 via the lines 135a and 138a, in response to the output of the AND gate 137.

When the read command above is executed, the command packet assembly circuit 150 is fed with the main storage address designated by that command via the line 120a, and with the PE number part 120a1 from within the address via the selector 151 and line 151a, as in case of execution of the write command described before.

Figure 12:
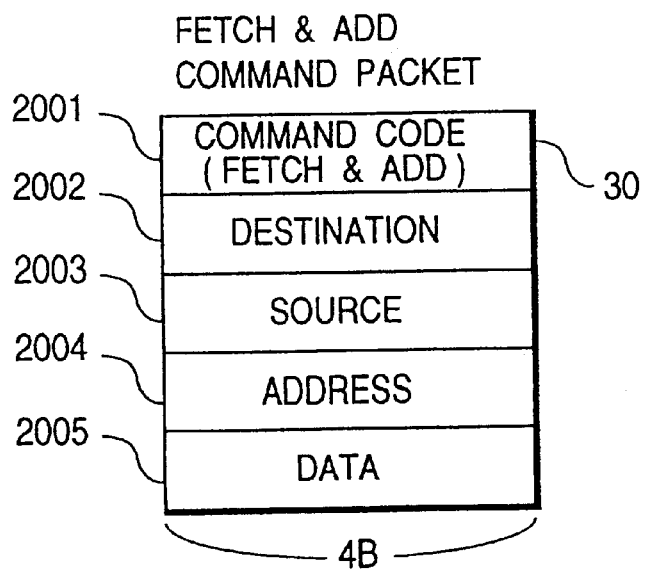
FIG. 12 illustrates a typical format of a fetch-and-add command packet for use in the embodiment of FIG. 6A.

When the fetch-and-add signal is supplied from the line 137a, the external access circuit 130 deems that the command has been executed by CPU and generates a fetch-and-add command packet 30 as illustrated in FIG. 12. The fetch-and-add command packet 30 differs from the write command packet of FIG. 11 in that the field 2001 includes a command code for the fetch-and-add command and field 2005 includes the flag addend supplied from the fetch-and-add register 135. The destination PE of the command packet 30 is the parent PE of the barrier synchronization.

When the fetch-and-add command packet 30 is sent over the network 900 to the parent PE and received thereby, the main storage access circuit 140 in that patent PE reads data at a main storage address included in the command packet from the local main storage 111 in the following manner. First, the command packet decomposition circuit 160 of the parent PE outputs a fetch-and-add signal 160d. This causes the read signal 120d to be sent to the local main storage 111 via a gate 142 and a line 142a. The old value of the fetch-and-add area is read from the local main storage 111 and is inputted to an adder 145 via the data line 120b. The old value is added to the data 160f (value −1 in this case) fed from the command packet decomposition circuit 160 simultaneously with the fetch-and-add signal 160c. In the next cycle, the fetch-and-add signal on the line 160d is sent as the write signal 120c to the local main storage 111 via a latch 144, the gate 141 and the signal line 141a. The value 145a acquired from the earlier addition is outputted onto the data bus line 120b via a latch 146 and the selector 147. As a result, a new value (i.e., value obtained by adding the addend designated by the fetch-and-add command packet to the old value) is written back into the local main storage. In this manner, the barrier synchronization flag value is decremented by 1.

How the event wait circuit 170 in each PE works will now be described. When some other PE performs a write operation into the local main storage 11 of each PE by use of a fetch-and-add command, the event is reported to the event wait circuit 170 via the signal line 141a within the PE. The subsequent operations are basically the same as those of the write command discussed earlier except for the following aspect: In case of a fetch-and-command, the barrier synchronization flag data written into the local main storage 111 remains positive until a total number of write operations reaches N. That is, the polling register 112 is not set every time a write operation is made to the local main storage 111 using a fetch-and-add command, but is set only when the total numbers of write operations has reached N, thereby causing a negative value to be written into the barrier synchronization flag area. In this manner, the event wait circuit 175 can detect occurrence of a barrier synchronization event through use of the negative judgment circuit 175 in the present embodiment.

In parallel with the above operations, the external access circuit 130 and command packet assembly circuit 150 transmit a data acknowledge command packet which contains the new data written into the local main storage 111 to the source PE of the fetch-and-add command packet in the following manner.

Figure 13:
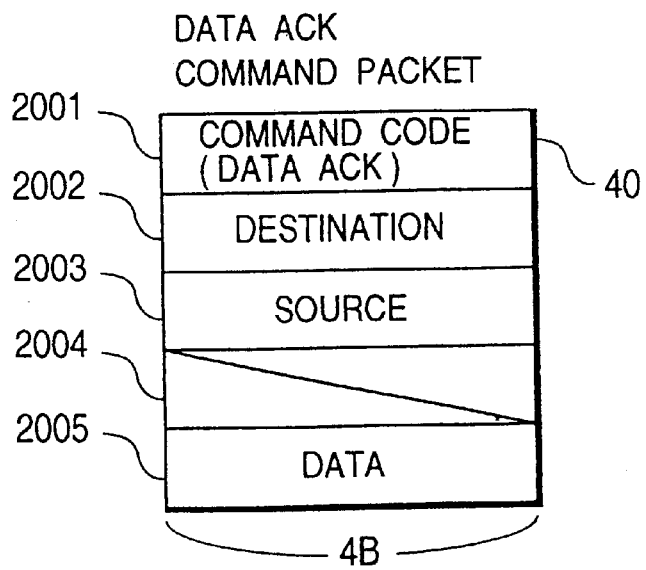
FIG. 13 shows a typical format of a data acknowledge command packet for use in the embodiment of FIG. 6A.

The output of the OR gate 142 in the main storage access circuit 140 is sent as a data acknowledge signal to the command packet assembly circuit 150 via a latch 143 and a line 143a. In response to this signal, the selector 151 (FIG. 6A) selects the source PE number provided onto a line 160h by the command packet decomposition circuit 160 and supplies the selected PE number as the destination PE number to the command packet assembly circuit 150 via the line 151a. The selector 138 of the external access circuit 130 selects the data from the bus line 120b when the data is read from the local main storage 111, and feeds the selected data to the command packet assembly circuit 150 via the line 138a. The selector 138 is arranged to select the data from the line 120b as mentioned above because the parent PE does not issue a read command in this case. The command packet assembly circuit 150 assembles a data acknowledge command packet as depicted in FIG. 13 when supplied with the data acknowledge signal via the line 143a. The assembled data acknowledge command packet is transmitted via the network 900 to the source PE of the fetch-and-add command packet. The fields 2002 and 2004 of the data acknowledge command packet respectively hold the source PE number supplied from the line 151a and the data fed via a line 138b. The field 2003 of the packet holds the PE number of this parent PE supplied from a register, not shown, inside the command packet assembly circuit 150.

In the PE that has received the data acknowledge command packet 40, the command packet assembly circuit 160 turns on an acknowledge signal 120e of the bus line 120 and at the same time provides the data 2005 in the packet onto the data bus line 120b. CPU receives the data from the data bus line 120b in responding to the data acknowledge signal.

Figure 10:
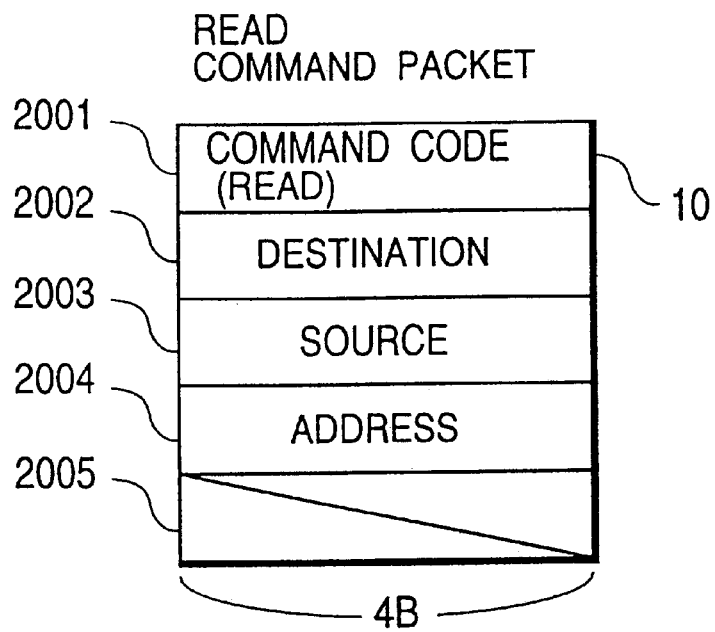
FIG. 10 shows a typical format of a read command packet for use in the embodiment of FIG. 6A.

The present embodiment can also utilize a read command packet 10 as shown in FIG. 10. The read command packet 10 is used to fetch data from the local main storage of other PE. This command packet is generated when CPU executes a read command in a state where the fetch-and-add register 135 holds zero in the external access circuit 130. That is, the read command packet 10 is generated, when the read command coming from the signal line 120d is sent to the command packet assembly circuit 150 via an AND gate 134 inside the external access circuit 130. Operations at the destination PE which receives this command are approximately the same as in the case of the above-described fetch-and-add command except that no data is written into the local main storage 111, and therefore the event wait circuit 170 does not operate. Thus further description of processing of the read command packet 10 will be omitted.

As described, the negative judgment circuit 175 is used upon execution of the fetch-and-add command to see if the barrier synchronization flag has been updated as many times as designated. It is not mandatory for the event flag to be negative in some cases explained earlier for the present embodiment, in which a check is made on a simple event flag to see if any event has occurred. However, adopting the architecture in which only a negative value is detected as the event flag offers the following advantages:

(a) Additional information about the event may be sent along with the event notification.

Where an event is sent from one PE to another, the address of the event flag may be used to identify the type of the event. In the case of a more complex event, additional information (i.e., argument) may be attached to the event. If the additional information is one word or less in length (e.g., where the number of necessary tasks is reported in a load distribution request), the additional information may be written directly into the event flag word. (Strictly speaking, arrangements must be made to set the additional information to a negative value.) If the information to be added to the event is two words or more in length (e.g., where the number of tasks as well as the address into which to write the tasks should be reported in a load distribution request), the word area alone of the event flag cannot convey the information. It is then necessary to provide an area (called the extended additional information area hereunder) into which to write the additional information. In such a case, the extended additional information area should preferably be contiguous to the event flag word in view of the easiness of coding of and comprehensibility of a program. However, in an architecture where occurrence of an event is detected when any value is written into the event flag area, occurrence of an event is also detected upon writing of the additional information. Such duplicate detection of occurrence of an event for a single event is not desirable. The deficiency is circumvented by writing a positive value into the word for additional information other than the event flag in an architecture wherein a negative value is used for event detection.

In the above architecture, the event source PE prepares a negative value as additional information to be written into the event flag area, and a positive value as the additional information to be written into the extended additional information area. Writing is first executed into the extended additional information area, and writing into the event flag area is always executed last. As a result, the event destination PE detects occurrence of an event only when a negative value is written into its event flag area. The destination PE then reads the additional information. Execution of writing into the event flag area last ensures reliable transmission of the extended additional information to the destination PE.

(b) Event flag reset is performed efficiently.

When the event source PE or other PE wishes to cancel the event it has generated, the PE writes a nonnegative value into the event flag area. Since the architecture allows an event to be detected only upon writing of a negative value, the writing of a nonnegative value resets the flag without generating an unnecessary event.

As described, the present embodiment constituted as described above permits detection of events transmitted via the shared memory with small amount of overhead.

Fourth Embodiment

FIG. 14A is a schematic block diagram of another parallel computer system according to the present invention. In the embodiment of FIG. 6A there is no constraint on the size of the main storage area in which to set flags but it is necessary that event flags be allocated in contiguous areas in the main storage and that an event is transmitted by making data on the main storage be a negative value. By contrast, the present embodiment of FIG. 14A allows event flags to be placed at any location in the main storage and permits use of any value for event detection. One disadvantage of the present embodiment is that a total number of events that may be awaited concurrently is limited by a total number of event wait circuits.

Figure 14B:
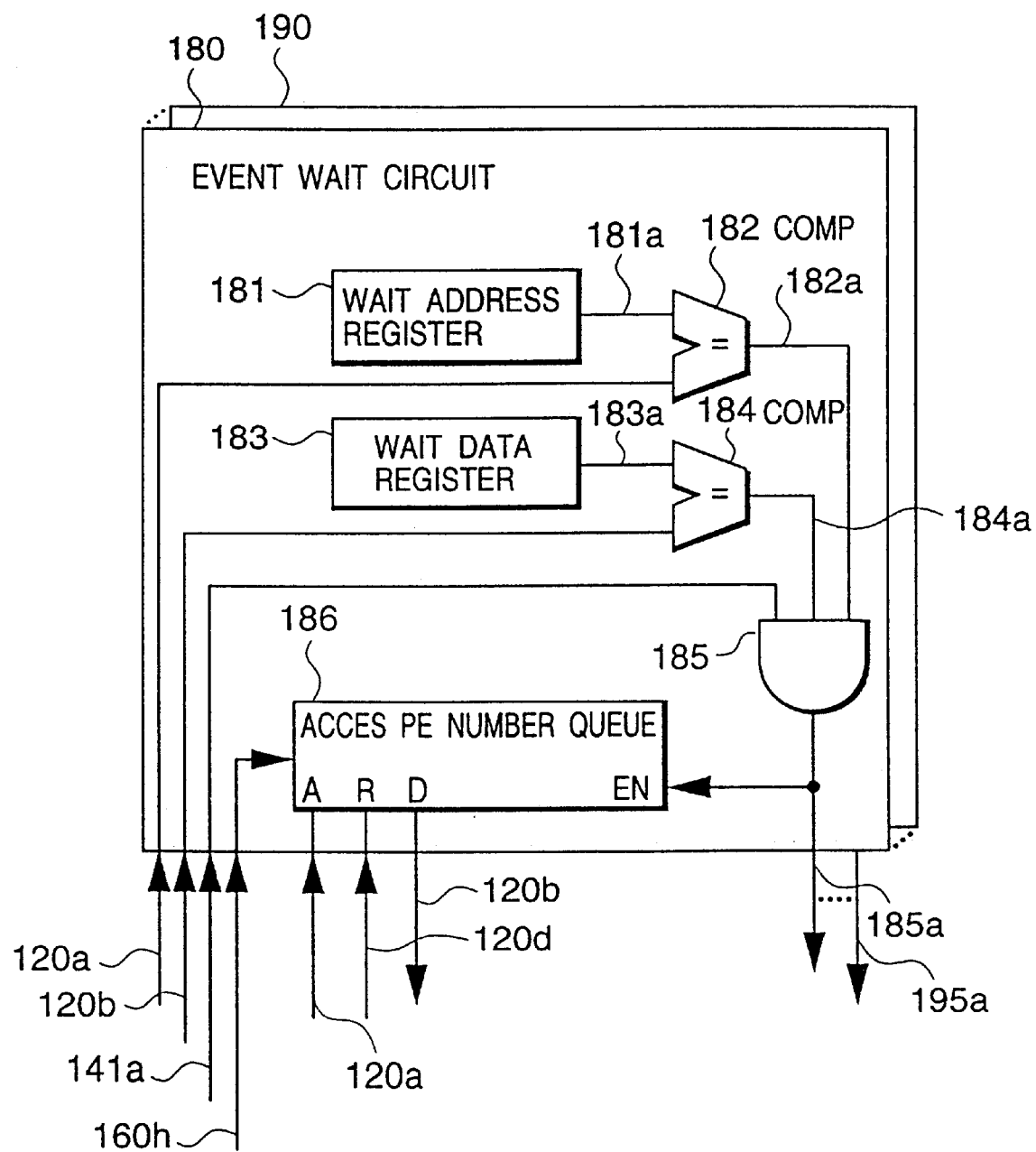
FIG. 14B is a schematic block diagram of an event wait circuit for use with the embodiment of FIG. 14A.

In FIG. 14A, reference numerals 180 and 190 denote an event wait circuit each. One event wait circuit can wait for one event. Each PE has at least one event wait circuit. As an example, the event wait circuit 180 alone will be described below. A detail of the event wait circuit 180 is shown in FIG. 14B. The other event wait circuits have exactly the same structure. In the event wait circuit 180, reference numeral 181 represents an event wait flag address register; 183 represents an event wait data register; 182 and 184 represent comparators for detecting an address and a data match respectively; and 185 represents an AND gate for detecting occurrence of an event based on the write signal 141a from another PE to the main storage as well as on comparator outputs 182a and 184a. A signal 185a (195a, etc.) informs each event wait circuit 180 (190, etc.) of the occurrence of an event. A gate 199 OR's the outputs 185a, 195a, etc. of the event wait circuits and sends its output to the polling latch 112 and interrupt control gate 114. The other circuit elements, the address map and network commands of the present embodiment in FIG. 14A are the same as those in FIG. 6A.

The circuit operations of FIG. 14A is the same as those of FIG. 6A except for the event wait circuits. Below is given only a description of the operation of the event wait circuit 180. When another PE accesses the main storage of this PE for a write operation thereto using a write command or a fetch-and-add command, the access is reported to the event wait circuit 180 by the signal 141a. A check is then made to see if the written address and data coincide respectively with the event flag address in the register 181 and the event generating data in the register 183. In the case of matches in the two registers, the gate 185 turns on the event generation signal 185a. The other event wait circuits (190, etc.) perform the check concurrently. Since the pitch of transmission of access commands from other PE's is slow, a total number of the comparator may be reduced by getting a plurality of event wait circuits to share a comparator to check event occurrence on a time division basis. When an event is detected, the PE number 160h of the PE that has written the value is retained by an event latch 186. This allows software easily to determine the PE number of the PE that has generated the event. The OR signal 199a of the outputs 185a, 195a, etc. from a plurality of event wait circuits may be used for polling and interruption, to reduce the overhead for event detection, as in the case of FIG. 6A.

The circuit of FIG. 14A has a constraint on a total number of events that may be awaited concurrently, but the circuit enables flexible detection of an event, because it can detect occurrence of an event irrespective of an address of an event flag area and irrespective of a value written into the event flag area.

Variations of the Third and the Fourth Embodiments (1) In the third embodiment, there is no need to use the additional information in the main storage or the information in the access PE number queue 178, if only presence or absence of an event needs to be reported. In such a case, only values in the access address queue 177 can be used to check if an event has arrived.

(2) In the third embodiment, the access address queue 177 is furnished for the purpose of enhancing processing speed but is not mandatory. If the access address queue 177 is removed, it is necessary for CPU to scan serially the event areas in the main storage to find the area meeting the event generation condition in the polling procedure by CPU discussed in connection with the third embodiment, instead of reading the content of the queue in steps (2) through (4). Although CPU is required to scan all the event areas in the main storage, the scan is performed only when the polling latch 112 has 1 and is suppressed when no event is generated. Thus the variation prevents execution of useless polling when no event flag is actually written.

The polling latch 112 may be reset before search of the main storage is started. This eliminates possibility of losing track of an event which arrives at an area to which search has just ended.

(3) Similarly, in the third embodiment, the access PE number queue 178 is also furnished for purpose of enhancing processing speed, but is not mandatory. If the access PE number queue 178 is removed, the same event flags arriving at the same time from a plurality of PE's cannot be distinguished. Where a load distribution request is made by use of an event between PE's, information about a PE that has written the event is important. The following can be executed if the queue 178 is removed. A different event area may be allocated to each PE, or the PE number of the requesting PE may be written into the flag area as additional information attached to the event.

(4) In the third embodiment, the negative judgment circuit 175 is not necessary where a simple event flag is used but not the barrier synchronization flag or the like.

(5) In the third embodiment, occurrence of an event is judged when a negative value is written into the event area. However, it is not mandatory for detection of occurrence of an event upon writing of solely a negative value. Instead, occurrence of an event may be detected upon writing of a positive value.

(6) Although the third and the fourth embodiments each use a distributed main storage, the present invention may also be applied to a case in which a physically concentrated main storage is shared by plural PE's. In such a case, the main storage access circuit of each PE may be used in conjunction with the event wait circuit arrangement employed in the third or fourth embodiment.

(7) The fetch-and-add command utilized by the third or fourth embodiment may be replaced by an atomic access command.

(8) The third and the fourth embodiments may also be applied to cases where flag areas for holding event flags are distributed in discrete locations in the shared main storage.

As described and according to the present invention, issue of useless lock requests is reduced, whereby the overhead of exclusive control on wasted lock requests is reduced, because the access requesting node issues an access request to a desired resource after detecting that the target resource is unlocked.

The shared main storage type parallel computer system according to the present invention, can easily detect generation of an event and eliminates wasteful polling of those flag areas in the main storage which contain no event flag because a circuit that detects occurrence of an event upon writing of data into a local main storage location in a case where transmission of an event between PE's is performed through the main memory.

If a circuit is provided according to the present invention to retain the main storage address to which an event flag has been written, CPU can check the retained main storage address to find easily which area the event flag has been written into. There is no need for CPU to access that flag area in the main storage which has the flag written thereinto.

If a circuit is provided according to the present invention to retain the PE number of any PE when the latter writes an event flag, this circuit allows CPU easily to find out which PE has written the event.

Furthermore, plural flag areas for holding event flags are provided in contiguous areas in the shared main storage according to the present invention, a practically unlimited number of event flags can be used through addition of a relatively simple circuit arrangement.

It is to be understood that while the invention has been described in conjunction with specific embodiments, it is evident that many alternatives, modifications and variations will become apparent to those skilled in the art in light of the foregoing description. Accordingly, it is intended that the present invention embraces all such alternatives, modifications and variations as fall within the spirit and scope of the appended claims.

What is claimed is:

1. A computer system, comprising:
   a plurality of nodes;
   at least one resource provided for use by any of said plurality of processing nodes; and
   a plurality of register sets, each register set being provided in a corresponding one of said plurality of processing nodes, for storing in parallel, use status information indicating whether said resource is in exclusive use status or not.

2. A computer system according to claim 1, wherein said resource is provided in one of said plurality of processing nodes.

3. A computer system according to claim 2, further comprising:
   a network connecting said plurality of processing nodes.

4. A computer system according to claim 1, wherein said use status information stored in a register set of a processing node is referred to when an exclusive use request is issued by said processing node.

5. A computer system comprising:
   a plurality of processing nodes;
   a plurality of resources distributed to said plurality of processing nodes, each of said resources being provided for use by any of said plurality of processing nodes; and
   a plurality of register sets, each register set being provided in a corresponding one of said plurality of processing nodes, for storing, in parallel, use status information indicating whether respective ones of said plurality of resources are in exclusive use status or not.

6. A computer system, comprising:
   a plurality of processing nodes;
   at least one resource provided for use by any of said plurality of processing nodes;
   a plurality of register sets, each register set being provided in a corresponding one of said plurality of processing nodes, storing, in parallel, use status information indicating whether said resource is in exclusive use status or not;
   a plurality of request issue circuits, each being provided in each of said plurality of processing nodes and issuing individually requests for exclusive use of said resources;

a message exchanging circuit serializing requests issued by said plurality of request circuits into a serialized order and broadcasting said requests to all of said processing nodes in said serialized order; and a plurality of status control circuits, each status control circuit being provided in each of said processing nodes corresponding to each of said register sets and updating individually a corresponding register set depending on use status information stored in said corresponding register set and each of the requests for exclusive use of said resource received at a corresponding processing node.

7. A computer system according to claim 6, wherein when each node is to use said resource exclusively, said each status control circuit generates information which indicates that said resource is in exclusive use, if said information stored in said register provided in said each processing node does not indicate that said resource is in exclusive use.

8. A computer system according to claim 6, wherein a plurality of pieces of information are provided by plural ones of said processing nodes, each of said pieces of information includes information identifying one of said processing nodes which has provided said each piece of information.

9. A computer system according to claim 6, wherein said resource is a disk storage device.

10. A computer system according to claim 6, wherein said resource is a shared file.

11. A computer system, comprising:

a plurality of processing nodes;

at least one resource provided for use by any of said plurality of processing nodes;

a plurality of register sets, each register set being provided in a corresponding one of said plurality of processing nodes, storing, in parallel, use status information indicating whether said resource is in exclusive use status or not;

a plurality of request issue circuits, each being provided in each of said plurality of processing nodes and issuing individually requests for exclusive use of said resource and for release of the exclusive use of said resource;

a message exchanging circuit serializing requests issued by said plurality of request issue circuits into a serialized order and broadcasting said requests to all of said processing nodes in said serialized order; and a plurality of status control circuits, each status control circuit being provided in each of processing nodes corresponding to each of said register sets and updating individually a corresponding register set depending on use status information stored in said corresponding register set and each of the requests for exclusive use of said resource or for release of the exclusive use of said resource received at a corresponding processing node.

12. A computer system, comprising:

a plurality of processing nodes;

a plurality of resources distributed to said plurality of processing nodes, each of said resources being provided for use by any of said plurality of processing nodes;

a plurality of register sets, each register set being provided in each of said plurality of processing nodes, storing, in parallel, use status information indicating whether respective ones of said plurality of resources are in exclusive use status or not;

a plurality of request issue circuit, each being provided in each of said plurality of processing nodes and issuing individually requests for exclusive use of said resources;

a message exchanging circuit serializing requests issued by said plurality of request issue circuits into a serialized order and broadcasting said requests to all of said processing nodes in said serialized order; and a plurality of status control circuits, each status control circuit being provided in each of processing nodes corresponding to each of said register sets and updating individually a corresponding register set depending on use status information stored in said corresponding register set and each of the requests for exclusive use of said resources received at a corresponding processing node.

* * * * *